United States Patent
Zhang et al.

(10) Patent No.: US 12,046,242 B2
(45) Date of Patent: Jul. 23, 2024

(54) AUDIO MESSAGE PROCESSING METHOD AND APPARATUS

(71) Applicant: Alibaba Group Holding Limited, Grand Cayman (KY)

(72) Inventors: Daping Zhang, Zhejiang (CN); Lili Zhang, Zhejiang (CN); Yixin Huang, Hangzhou (CN); Yun Chen, Hangzhou (CN); Jiandong Lai, Hangzhou (CN); Haohua Zhong, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 200 days.

(21) Appl. No.: 17/316,931

(22) Filed: May 11, 2021

(65) Prior Publication Data

US 2021/0266280 A1 Aug. 26, 2021

Related U.S. Application Data

(63) Continuation of application No. 16/143,372, filed on Sep. 26, 2018, now Pat. No. 11,037,568, which is a
(Continued)

(30) Foreign Application Priority Data

Mar. 29, 2016 (CN) .......................... 201610187534.9

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/22* (2013.01); *G10L 15/30* (2013.01); *H04L 51/046* (2013.01);
(Continued)

(58) Field of Classification Search
CPC ......... G10L 15/26; G10L 15/22; G10L 15/30; G10L 21/10; H04L 51/046; H04L 51/066; H04L 51/10; H04L 67/565; H04W 4/18
(Continued)

(56) References Cited

U.S. PATENT DOCUMENTS 5,724,410 A    3/1998  Parvulescu et al.
5,799,279 A *  8/1998  Gould ..................... G10L 15/26
                                                    704/E15.044
(Continued)

FOREIGN PATENT DOCUMENTS

CN        1798220 A      7/2006
CN      103281683 A      9/2013
(Continued)

OTHER PUBLICATIONS

Translation of Chinese Office Action dated Feb. 18, 2020, from corresponding CN Patent Application No. 201610187534.9, 9 pages.
(Continued)

*Primary Examiner* — Abul K Azad
(74) *Attorney, Agent, or Firm* — Lee & Hayes, P.C.

(57) ABSTRACT

Audio message processing methods and apparatuses are provided, where a method may include a server recognizing types of communication messages transmitted between communicating counterparties; when a type of any communication message is an audio type, the server acquiring the any communication message, and converting the any communication message to corresponding text content; and upon determining that any communicating party has a conversion need for the any communication message, the server sending the text content to the any communicating party. Through technical solutions of the present disclosure, text conversion
(Continued)

may be performed upon audio messages in advance, thereby increasing response speed for audio conversion requests of users.

20 Claims, 22 Drawing Sheets

Related U.S. Application Data continuation of application No. PCT/CN2017/077257, filed on Mar. 20, 2017.

(51) Int. Cl.
| | | |
|---|---|---|
| *G10L 15/30* | (2013.01) | |
| *H04L 51/046* | (2022.01) | |
| *H04L 51/066* | (2022.01) | |
| *H04L 51/10* | (2022.01) | |
| *H04W 4/18* | (2009.01) | |
| *H04L 67/565* | (2022.01) | |

(52) U.S. Cl.
CPC ............ *H04L 51/066* (2013.01); *H04L 51/10* (2013.01); *H04W 4/18* (2013.01); *H04L 67/565* (2022.05)

(58) Field of Classification Search
USPC ............................... 379/88.01–88.28; 704/35
See application file for complete search history.

(56) References Cited

U.S. PATENT DOCUMENTS

| | | | |
|---|---|---|---|
| 6,353,809 B2 | 3/2002 | Takahashi et al. | |
| 6,871,179 B1 | 3/2005 | Kist et al. | |
| 7,130,401 B2* | 10/2006 | Rampey | H04M 15/06 |
| | | | 455/414.4 |
| 7,136,462 B2 | 11/2006 | Pelaez et al. | |
| 8,155,958 B2 | 4/2012 | Terao | |
| 9,111,545 B2 | 8/2015 | Jadhav et al. | |
| 9,215,203 B2 | 12/2015 | Yasrebi et al. | |
| 9,401,146 B2* | 7/2016 | Sharifi | H04M 3/42204 |
| 9,715,876 B2* | 7/2017 | Hager | H04L 51/066 |
| 10,033,864 B2 | 7/2018 | Patel et al. | |
| 10,129,198 B2 | 11/2018 | Malahy | |
| 10,223,066 B2 | 3/2019 | Martel et al. | |
| 2001/0033639 A1* | 10/2001 | Martin | H04M 3/5307 |
| | | | 379/88.14 |
| 2004/0062365 A1* | 4/2004 | Agraharam | H04L 51/00 |
| | | | 379/88.13 |
| 2004/0176114 A1 | 9/2004 | Northcutt | |
| 2004/0267527 A1 | 12/2004 | Creamer et al. | |
| 2005/0266829 A1 | 12/2005 | Tran et al. | |
| 2005/0266863 A1 | 12/2005 | Benco et al. | |
| 2007/0047702 A1* | 3/2007 | Newell | H04L 51/56 |
| | | | 379/101.01 |
| 2007/0208570 A1* | 9/2007 | Bhardwaj | G06F 16/3331 |
| | | | 704/270.1 |
| 2007/0260456 A1 | 11/2007 | Proux et al. | |
| 2007/0265850 A1* | 11/2007 | Kennewick | G10L 15/22 |
| | | | 704/E15.04 |
| 2009/0070109 A1 | 3/2009 | Didcock et al. | |
| 2009/0253463 A1* | 10/2009 | Shin | H04W 4/16 |
| | | | 704/E15.001 |
| 2011/0300833 A1 | 12/2011 | Shaw | |
| 2013/0023287 A1* | 1/2013 | Shaw | G10L 13/00 |
| | | | 379/93.01 |
| 2013/0294591 A1* | 11/2013 | Shaw | H04M 3/53333 |
| | | | 379/88.13 |
| 2014/0337458 A1* | 11/2014 | Barton | H04L 67/5681 |
| | | | 709/213 |
| 2014/0350929 A1 | 11/2014 | Kim | |
| 2015/0162002 A1* | 6/2015 | Liu | G10L 15/1822 |
| | | | 704/235 |
| 2015/0162003 A1 | 6/2015 | Zhai | |
| 2017/0085506 A1 | 3/2017 | Gordon | |
| 2017/0236517 A1 | 8/2017 | Yu et al. | |
| 2019/0027150 A1 | 1/2019 | Zhang et al. | |

FOREIGN PATENT DOCUMENTS

| | | |
|---|---|---|
| CN | 103632670 A | 3/2014 |
| CN | 104700836 A | 6/2015 |
| CN | 105162836 A | 12/2015 |
| CN | 105869654 A | 8/2016 |
| FR | 2947688 A1 | 1/2011 |

OTHER PUBLICATIONS

Translation of Chinese Office Action dated May 30, 2019, from corresponding CN Patent Application No. 201610187534.9, 10 pages.
Translation of Third Chinese Office Action dated Jun. 2, 2020, from corresponding CN Patent Application No. 201610187534.9, 8 pages.
Translation of Chinese Search Report dated May 30, 2019, from corresponding CN Patent Application No. 201610187534.9, 3 pages.
Translation of Search Report dated Jun. 22, 2017, from corresponding CN PCT Application No. PCT/CN2017/077257, 4 pages.
Final Office Action dated Dec. 22, 2020 for U.S. Appl. No. 16/143,372, "Audio Message Processing Method and Apparatus," Zhang, 12 pages.
Non Final Office Action dated Jul. 29, 2020 for U.S. Appl. No. 16/143,372 "Audio Message Processing Method and Apparatus," Zhang, 10 pages.
Translation of Written Opinion dated Jun. 22, 2017, from corresponding CN PCT Application No. PCT/CN2017/077257, 10 pages.

\* cited by examiner

AUDIO MESSAGE PROCESSING METHOD AND APPARATUS

CROSS REFERENCE TO RELATED PATENT APPLICATIONS

This application claims priority to U.S. patent application Ser. No. 16/143,372, filed on Sep. 26, 2018, which claims priority and is a continuation of PCT Patent Application No. PCT/CN2017/077257, filed on Mar. 20, 2017, which claims priority to Chinese Patent Application No. 201610187534.9, filed on Mar. 29, 2016 and entitled "AUDIO MESSAGE PROCESSING METHOD AND APPARATUS" all of which are incorporated herein by reference in their entirety.

TECHNICAL FIELD

The present disclosure relates to the field of communication technology, and, more particularly, to audio message processing methods and apparatuses.

BACKGROUND

Through electronic devices having installed communication applications, receipt and transmission of communication messages between users may be realized, causing communication between the users to be more convenient and faster.

Usually, communication applications, through collecting text manually input by a user, receive and transmit text as communication messages. However, manual input has limitations in various aspects, such as the need for a user to fix both eyes upon the screen of an electronic device, so that when a user enters a driving state, manual entry brings about significant safety risk; another example is that, when an electronic device is comparatively large and cannot be held in one hand, a user must use both hands to hold the device in order to complete an input operation, and supposing that a user is holding heavy items with one hand, it is difficult to complete manual input using the other hand.

Some communication applications, through adding audio input functionality, cause users to be able to more conveniently receive and transmit communication messages of an audio type, eliminating the above-mentioned limitations.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of this, the present disclosure provides audio message processing methods and apparatuses, which may perform text conversion upon audio messages in advance, thereby improving response speed for audio conversion requests of users.

To realize the above-mentioned purpose, the present disclosure provides technical solutions as follows:

Based on an aspect of the present disclosure, an audio message processing method is set forth, including:

A server recognizing the types of communication messages transmitted between communicating counterparties;

When the type of any communication message is an audio type, the server acquiring the any communication message, and converting the any communication message to corresponding text content;

Upon determining that any communicating party has a conversion need for the any communication message, the server sending the text content to the any communicating party.

Based on another aspect of the present disclosure, an audio message processing method is set forth, including:

A present end communication device, upon receipt of an audio conversion command issued by a user targeting any communication message of an audio type, initiating a corresponding audio conversion request to a server;

The present end communication device receiving text content pertaining to the any communication message returned by the server, and displaying the text content in association with the any communication message; wherein, the text content is obtained from pre-conversion on a proactive basis by the server before the server receives the audio conversion request.

Based on another aspect of the present disclosure, an audio message processing method is set forth, including:

A present end communication device pre-fetching text content pertaining to any communication message of an audio type;

Upon receipt of an audio conversion command targeting the any communication message issued by a user, the present end communication device showing the pre-fetched text content.

Based on another aspect of the present disclosure, an audio message processing method is set forth, including:

During the procedure of generating a communication message of an audio type, a present end communication device successively determining whether each collected audio segment satisfies preset segmentation rules.

Upon any audio segment satisfying the preset segmentation rules, the present end communication device segmenting the any audio segment in real time and uploading thereof to a server, the server pre-converting the any audio segment to a corresponding text fragment, text fragments pertaining to all audio segments being successively combined by the server into text content pertaining to the communication message.

Based on another aspect of the present disclosure, an audio message processing apparatus is set forth, including:

A recognizing unit, which causes a server to recognize the types of communication messages transmitted between communicating counterparties;

A pre-converting unit, which, when the type of any communication message is an audio type, causes the server to acquire the any communication message, and pre-convert the any communication message to corresponding text content;

A sending unit, which, upon a determination that any communicating party has a conversion need for the any communication message, causes the server to send the text content to the any communicating party.

Based on another aspect of the present disclosure, an audio message processing apparatus is set forth, including:

A requesting unit, which causes a present end communication device to, upon receipt of an audio conversion command issued by a user targeting any communication message of an audio type, initiate a corresponding audio conversion request to a server;

A displaying unit, which causes the present end communication device to receive the text content pertaining to the any communication message returned by the server, and display the text content in association with the any communication message; wherein, the text content results from proactive pre-conversion by the server before the audio conversion request is received.

Based on another aspect of the present disclosure, an audio message processing apparatus is set forth, including:

A pre-fetching unit, which causes a present end communication device to pre-fetch text content pertaining to any communication message of an audio type;

A displaying unit, which, upon receipt of an audio conversion command issued by a user targeting the any communication message, causes the present end communication device to show the pre-fetched text content.

Based on another aspect of the present disclosure, an audio message processing apparatus is set forth, including:

A determining unit, which, during the procedure of generating communication messages of an audio type, causes a present end communication device to successively determine whether each already collected audio segment satisfies a preset segmentation rule;

A processing unit, which, upon any audio segment satisfying the preset segmentation rule, causing the present end communication device to segment and upload the any audio segment to a server in real time, the server pre-converting the any audio segment to a corresponding text fragment, text fragments pertaining to all audio segments being successively combined by the server into text content pertaining to the communication message.

Based on another aspect of the present disclosure, an audio message processing method is set forth, including:

Upon receipt of an audio conversion request of any communicating party targeting any audio message, a server determining a non-responded audio message relating to the any communicating party;

The server respectively obtaining text content pertaining to the any audio message and the non-responded audio message, and returning the text content to the any communicating party.

Based on another aspect of the present disclosure, an audio message processing method is set forth, including:

Upon receipt of an audio conversion command issued by a user targeting any audio message, a present end communication device respectively determining a first text content pertaining to the any audio message, and a second text content pertaining to the non-responded audio messages aside from the any audio message;

The present end communication device respectively displaying in association the first text content with the any audio message, and the second text content with the non-responded audio messages.

Based on another aspect of the present disclosure, an audio message processing apparatus is set forth, including:

A determining unit, which, upon receipt of an audio conversion request of any communicating party targeting any audio message, causes a server to determine non-responded audio messages relating to the any communicating party;

A returning unit which causes the server to respectively acquire text content pertaining to the any audio message and the non-responded audio messages, and return the text content to the any communicating party.

Based on another aspect of the present disclosure, an audio message processing apparatus is set forth, including:

A determining unit, which, upon receipt of an audio conversion command issued by a user targeting the any audio message, causes a present end communication device to respectively determine a first text content pertaining to the any audio message, and a second text content pertaining to the non-responded audio messages aside from the any audio message;

A displaying unit which causes the present end communication device to respectively display in association the first text content with the any audio message, and the second text content with the non-responded audio messages.

By the above technical solutions, it may be seen that the present disclosure, through performing text conversion upon audio messages in advance, allows, when a user has a need for audio conversion, immediate feedback of corresponding text content, without the need for waiting during the translation process. This effectively speeds up response speeds to user needs, thereby improving the application experience of users.

DETAILED DESCRIPTION

When a user utilizes audio communication messages, certain setting limitations exist. By way of example, when a user receives audio communication messages during a meeting, unless the user is wearing a Bluetooth earpiece or other wearable device, the user may otherwise be unable to listen to the communication messages on a timely basis, causing related events to be mishandled.

To resolve the above-mentioned problem existing with regard to audio communication messages, current methods set forth conversion of audio messages to text, wherein in particular: when a user receives a communication message in an audio format, if listening is inconvenient, an audio conversion request targeting the communication message may be initiated to a server, and the server may proactively recognize the audio data, and return text content obtained from the conversion to the user, facilitating reading by the user.

However, an audio conversion operation by a server upon a communication message requires a certain length of time, causing a user, after issuing the conversion request to the server, to need to wait for a comparatively long time to be able to view the converted text content. In one aspect, this causes the user to wait for a long time, increasing the user's sense of anxiety, and in another aspect this results in the phenomenon of the user not replying for a long time, so that the sending party user of the communication message is unable to receive feedback for a long time, which not only impacts the application experience of the user, but also causes communication efficiency between users to be greatly lowered.

Figure 1:
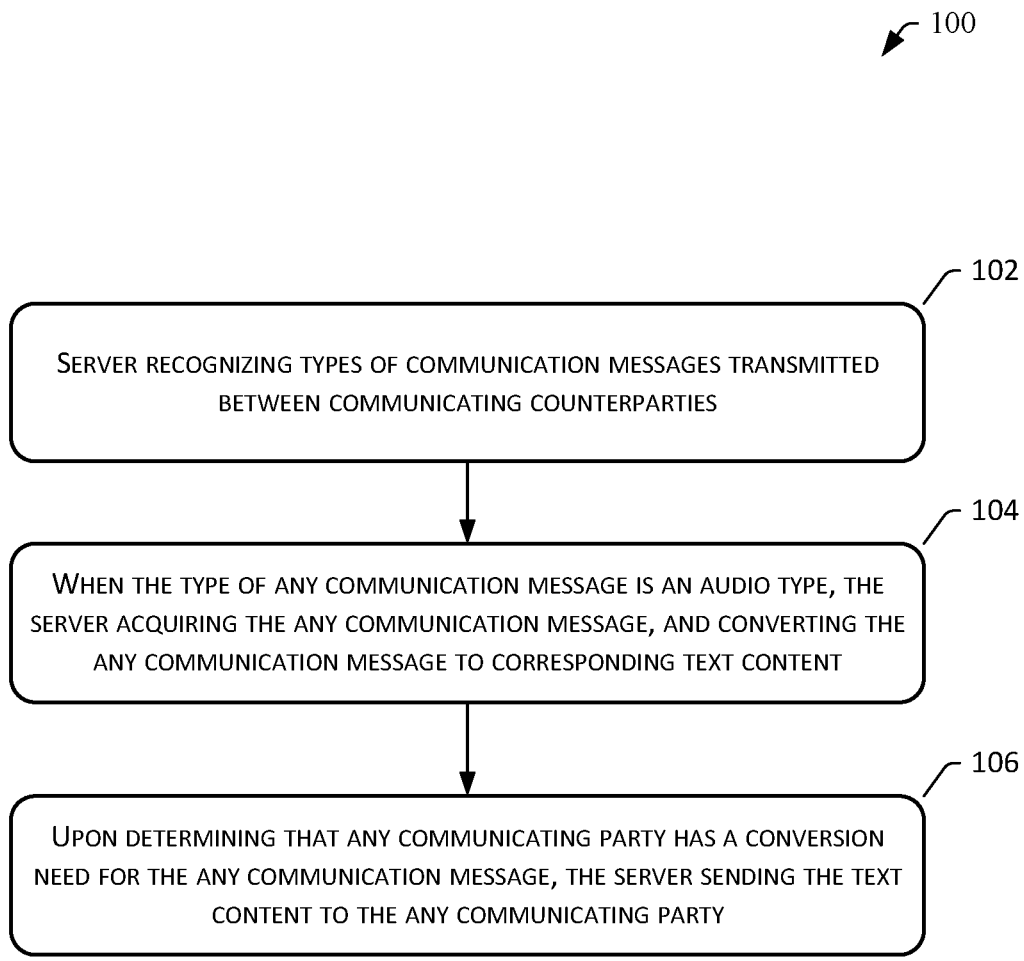
FIG. 1 is a flowchart of an audio message processing method based on a server end provided according to an example embodiment of the present disclosure.

Therefore, the present disclosure, through improving the audio message processing procedures, solves the above-mentioned technological problems of the current methods. To further explain the present disclosure, the below example embodiments are provided:

FIG. 1 is a flowchart of an audio message processing method 100 based on a server end provided according to an example embodiment of the present disclosure. As illustrated by FIG. 1, the method 100 may include:

Step 102, a server recognizing types of communication messages transmitted between communicating counterparties.

Step 104, when the type of any communication message is an audio type, the server acquiring the any communication message, and converting the any communication message to corresponding text content.

Step 106, upon determining that any communicating party has a conversion need for the any communication message, the server sending the text content to the any communicating party.

According to the present example embodiment, a server may proactively decide a conversion need of a communicating party for an audio message; for example, when any communicating party during a communication procedure belongs to a preset communication role, the server may evaluate that the any communicating party has a conversion need, and send a corresponding text content. By way of example, the server may predefine that a receiving party has a conversion need by default, so that as long as audio messages exist, the server always converts corresponding text content in advance, and proactively send the text content to the communication device of the receiving party.

According to the example embodiment, through pre-conversion processing by the server, text content is sent to a communication device on a proactive basis, so that when a corresponding communicating party actually needs to execute audio conversion, the communication device may directly retrieve and display text content that has already been stored locally, without needing to download from the server in real time. As such, even if Internet connectivity is poor at the time, the display of text content of the audio message will not be impacted, lowering the need for real-time Internet connectivity.

According to the present example embodiment, a server may, based on the request situation of a communicating party, evaluate whether a conversion need exists; for example, upon receipt of an audio conversion request of any communicating party targeting any communication message, the server may decide that the any communicating party has a conversion need, and return to the any communicating party pre-converted text content pertaining to the any communication message.

According to the present example embodiment, a server only returns corresponding text content when a communicating party actually has a need; through accurate judgment of the actual request of the communicating party, the number of interactions between the server and a communication device may be reduced, lowering the amount of data of communications between the server and the communication device, which in one aspect helps to lower power consumption of the communication device, and in another aspect with regard to communication devices connecting to the Internet utilizing wireless mobile communication, may reduce the consumption of wireless data, avoiding causing unnecessary cost losses for users.

By the above-mentioned example embodiment it may be known that, according to technical solutions of the present disclosure, a server may, prior to a user submitting an audio conversion need, proactively perform conversion upon audio messages in advance to obtain corresponding text content, so that when the server receives an audio conversion need coming from a user, the text content may be immediately returned to the user, without the need to wait for the server to perform conversion upon the audio message, greatly shortening waiting time for the receiving party user, and shortening waiting time for a counterparty sending party user to receive feedback, thus not only improving the user experiences of the communicating counterparties, but also greatly improving communication efficiency between the communicating counterparties.

Figure 2:
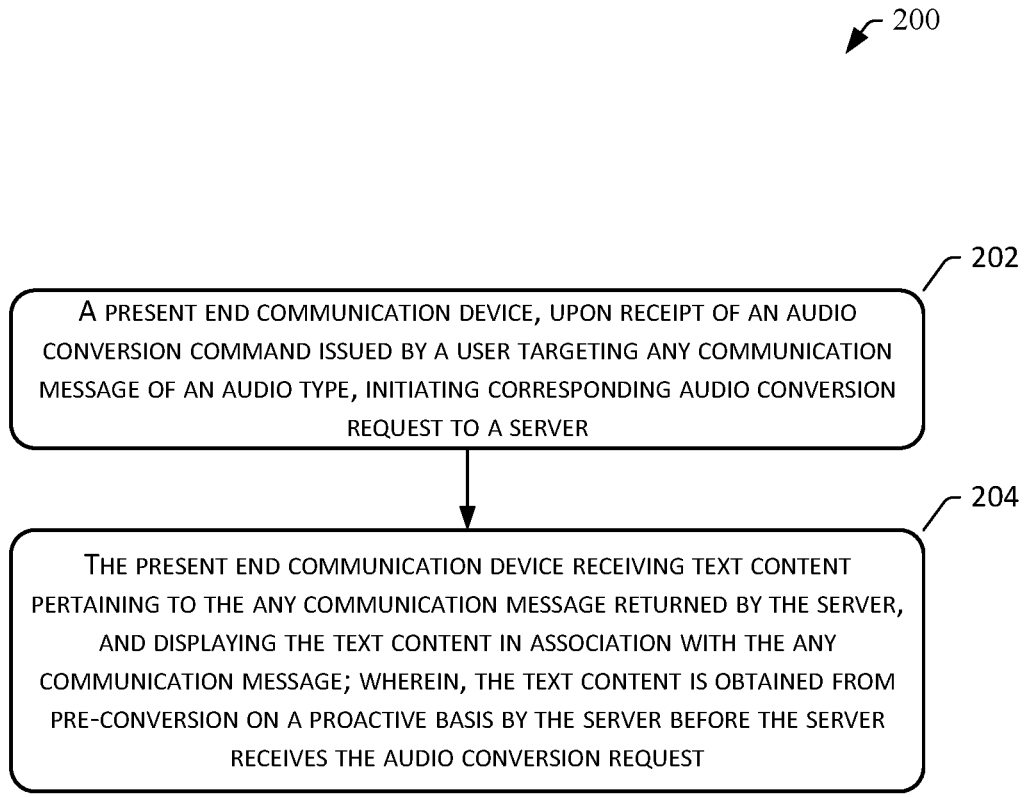
FIG. 2 is a flowchart of an audio message processing method based on a communication device end provided according to a first example embodiment of the present disclosure.

Pertaining to the example embodiment illustrated by FIG. 1, a communication device utilized by a user has multiple corresponding example embodiments, described below by way of example:

FIG. 2 is a flowchart of an audio message processing method 200 based on a communication device end provided by an example embodiment of the present disclosure, where as illustrated by FIG. 2, the method 200 may include:

Step 202, a present end communication device, upon receipt of an audio conversion command issued by a user targeting any communication message of an audio type, initiating a corresponding audio conversion request to a server.

Step 204, the present end communication device receiving text content pertaining to the any communication message returned by the server, and displaying the text content in association with the any communication message; wherein, the text content is obtained from pre-conversion on a proactive basis by the server before the server receives the audio conversion request.

According to the present example embodiment, the present end communication device, based on the audio conversion command issued by the user, proactively initiates an audio conversion request to the server, indicating an actual need with regard to audio conversion, and the server correspondingly returns the needed text content.

By the above-mentioned example embodiment it may be known that, according to technical solutions of the present disclosure, based on a server proactively performing pre-conversion processing upon audio messages in advance, when the present end communication device, based on an audio conversion command of a user, initiates an audio conversion request to a server, corresponding text content may be immediately acquired from the server, without needing to wait for the server to perform real-time conversion upon audio messages, helping to improve the user experiences of the communicating counterparties, and greatly increasing communication efficiency between the communicating counterparties.

Figure 3:
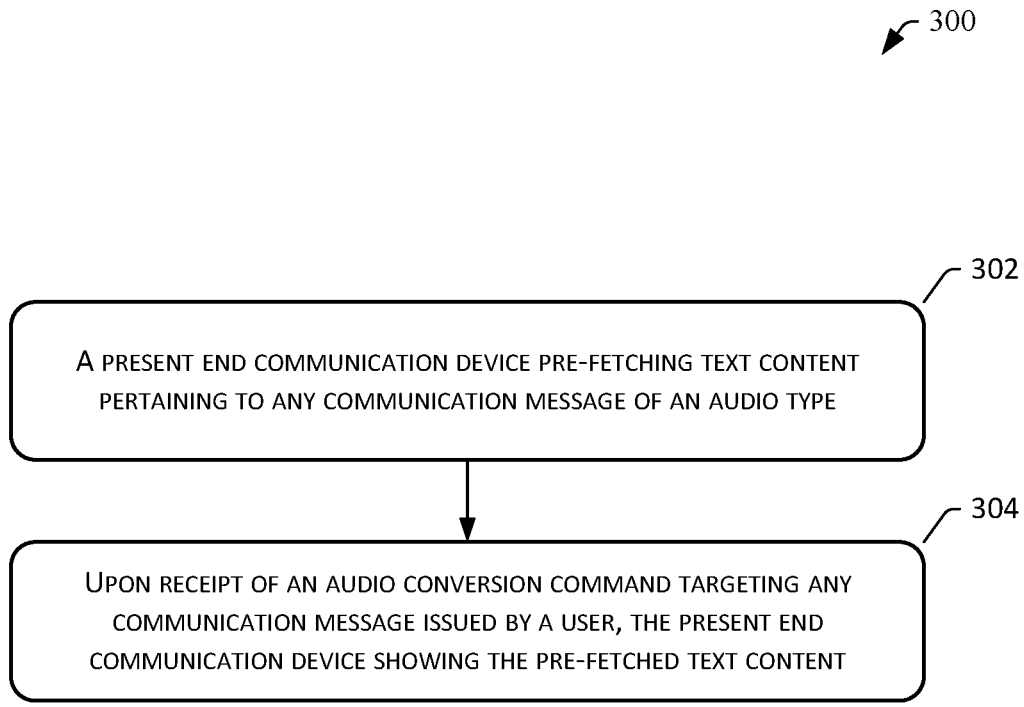
FIG. 3 is a flowchart of an audio message processing method based on a communication device end provided according to a second example embodiment of the present disclosure.

FIG. 3 is a flowchart of an audio message processing method 300 based on a communication device end provided by a second example embodiment of the present disclosure, where as illustrated by FIG. 3, the method 300 may include:

Step 302, a present end communication device pre-fetching text content pertaining to any communication message of an audio type.

According to the present example embodiment, the present end communication device may pre-fetch text content from a server, the text content being obtained by conversion by the server. Herein, the text content may be pushed to the present end communication device on a proactive basis by the server; or, the present end communication device, when determining the types of communication messages transmitted between the end communication devices, if determining that the type of the any communication message is an audio type, may initiate an audio conversion request to the server, and acquire text content obtained from conversion processing by the server. According to the present example embodiment, through the server executing pre-conversion processing, not only may the superior processing power of the server be fully utilized, increasing the efficiency of executing pre-conversion processing upon audio messages, but processing performance requirements and processing resource usage of the present end communication device may also be lowered, thereby lowering power consumption of the present end communication device.

According to example embodiments of the present disclosure, a present end communication device may voluntarily perform pre-conversion processing upon any communication message, obtaining the text content; in other words, the present end communication device performs local pre-conversion processing upon audio messages. For example, the present end communication device, when determining the types of communication messages transmitted between the end communication devices, if determining that the type of any communication message is an audio type, may execute the local pre-conversion processing, and obtain corresponding text content. According to the example embodiment, through utilizing local pre-conversion processing, requirements for the Internet may be eliminated or lowered, thereby becoming suitable in more application settings.

Step 304, upon receipt of an audio conversion command targeting the any communication message issued by a user, the present end communication device showing the pre-fetched text content.

By the above-mentioned example embodiment it may be known that, according to technical solutions of the present disclosure, the present end communication device, through pre-fetching of text content, causes, when the user issues an audio conversion command, the present end communication device to be able to directly acquire and display corresponding text content, without needing the user to wait while the conversion process proceeds, helping to increase the communication efficiency. At the same time, through pre-fetching text content locally onto the present end communication device, when the user issues an audio conversion command, there is no requirement for the Internet environment, such that even though the present end communication device is not connected to the Internet, the user can still view the text content corresponding to the audio message, suitable for the user to check historical communication messages in various special settings.

Figure 4:
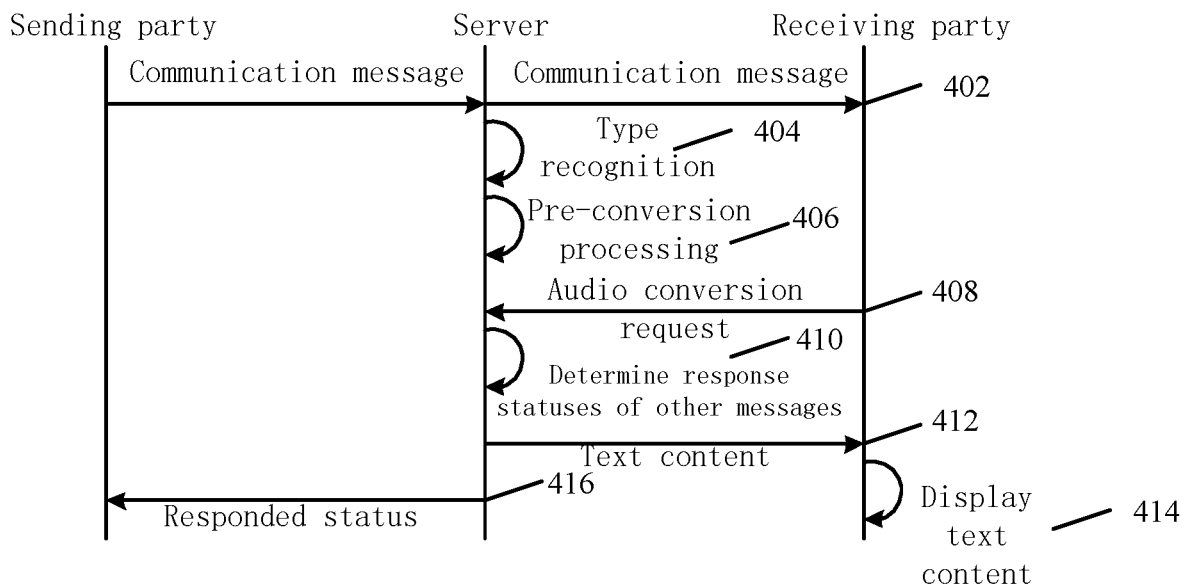
FIG. 4 is a flowchart of an audio message processing method provided according to an example embodiment of the present disclosure.

Below, technical solutions of the present disclosure are described in detail in conjunction with interaction procedures among a sending party, a receiving party and a server involved in a communication procedure; herein, FIG. 4 is a flowchart of an audio message processing method 400 provided according to an example embodiment of the present disclosure, where as illustrated by FIG. 4, the method 400 may include the following steps:

Step 402, the server acquiring communication messages transmitted between communicating counterparties.

According to the present example embodiment, communicating counterparties according to technical solutions of the present disclosure are fully equivalent, such that each communicating party may serve as the sending party or the receiving party as illustrated by FIG. 4; thus according to the example embodiment as illustrated by FIG. 4, corresponding sending party and receiving party are actually determined for a particular communication procedure between targeted communicating counterparties, which are operative to illustrate examples of the technical solutions of the present disclosure.

Step 404, the server performing type recognition upon communication messages.

According to the present example embodiment, communication messages may include many types, and according to the present disclosure arbitrary communication messages containing audio data may be decided as being audio type, i.e., audio messages, such as voice messages, video messages, and the like; the below, in conjunction with an interface diagram of a communication application, illustrates voice messages as an example of audio messages, though the present disclosure shall not be limiting thereto.

Step 406, the server performing pre-conversion processing upon communication messages of an audio type (that is, audio messages), and obtaining corresponding text content.

According to the present example embodiment, the server may utilize any method according to current technologies to perform pre-conversion processing upon audio messages, and obtain corresponding text content.

It should be stated that, after the server detects some particular communication message as an audio type, executing the pre-conversion processing and obtaining corresponding text content may occur with any appropriate timing, ensuring only that the pre-conversion processing is completed before step 408. In other words, pre-conversion processing upon the audio message by the server is unrelated to a user initiating an audio conversion command for the audio message, and the pre-conversion processing is completed by the server in advance on a proactive basis.

Therefore, when a user initiates an audio conversion command for the audio message to the server, the server may immediately provide the text content obtained from pre-conversion to the user, without the server needing to execute message conversion in real-time, avoiding the communicating counterparties waiting for a long time, and helping to increase the communication efficiency.

Step 408, the server receiving an audio conversion request of the receiving counterparty targeting the audio message.

According to the present example embodiment, with regard to each communicating party related to the audio message, the sending party, receiving party and the like as illustrated in FIG. 4 may issue an audio conversion request, and a corresponding electronic device initiates an audio conversion request to the server (which may also be understood as the sending party, the receiving party, and the like initiating an audio conversion request to the server); here, the example is described with the receiving party initiating the audio conversion request.

Figure 5:
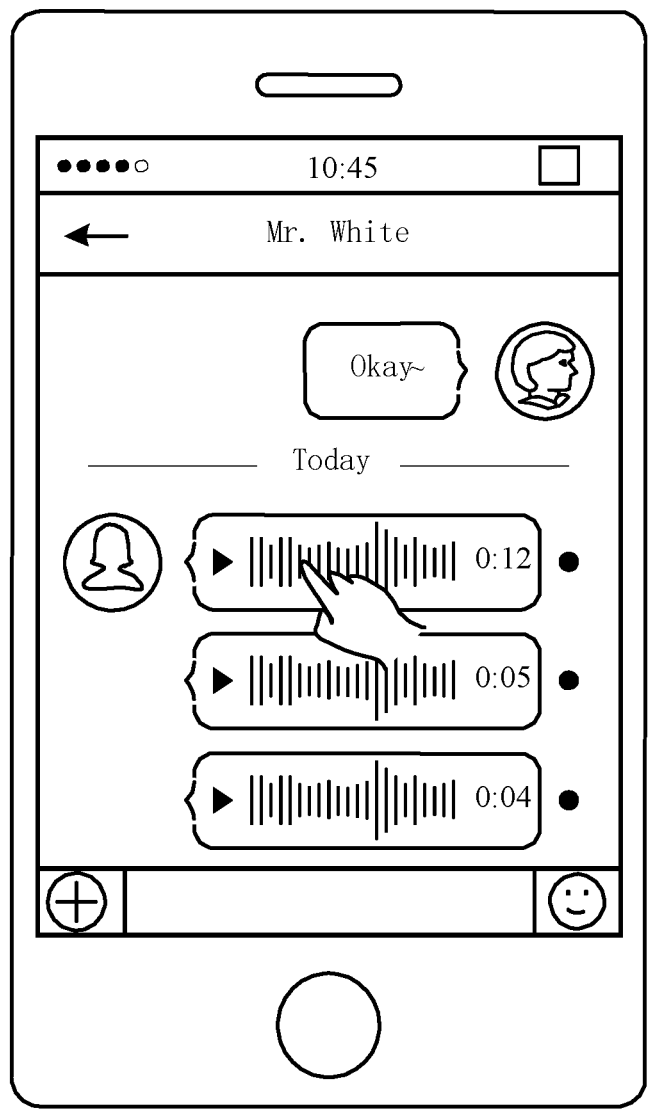
FIGS. 5-8 are interface diagrams of a communication application based on a receiving party end provided according to an example embodiment of the present disclosure.
Figure 6:
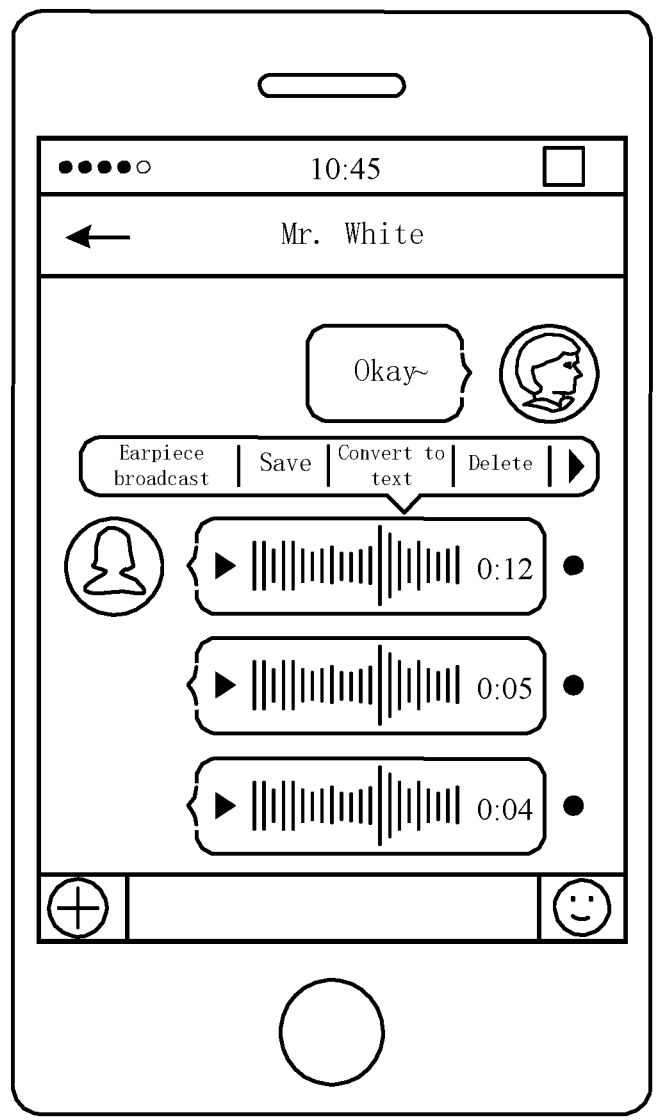

Suppose that communication is realized between user "Mr. White" and user "Mr. Black"; herein, the present disclosure does not limit the type of communication application utilized by the two parties, and the communication application may be an instant messaging application, where the instant messaging application may, for example, be an enterprise instant messaging (EIM) application, such as DingTalk and the like. As illustrated by FIG. 5, suppose that user "Mr. White" has sent several audio messages to user "Mr. Black," such that user "Mr. Black" may through long-clicking (or hard-pressing and such other trigger methods) the audio message desired to be viewed, call up a function option menu as illustrated by FIG. 6, the function option menu containing "earpiece broadcast," "save," "convert to text," "delete" and such function options, such that after user "Mr. Black" selects the "convert to text" function option, it may be decided that an audio conversion command targeting a corresponding audio message has been issued to the electronic device, and by the electronic device a corresponding audio conversion request is initiated to the server.

Step 410, the server determining the response statuses of other audio messages.

Step 412, the server sending the text content pertaining to the audio message to the receiving party.

Step 414, the receiving party displaying the received text content.

According to an example embodiment, when the above-mentioned step 410 is not included, the server may directly determine the text content pertaining to the audio message having a length of 12 seconds selected by user "Mr. Black" as illustrated by FIG. 5, and return the text content to user "Mr. Black," for displaying to user "Mr. Black."

Figure 7:
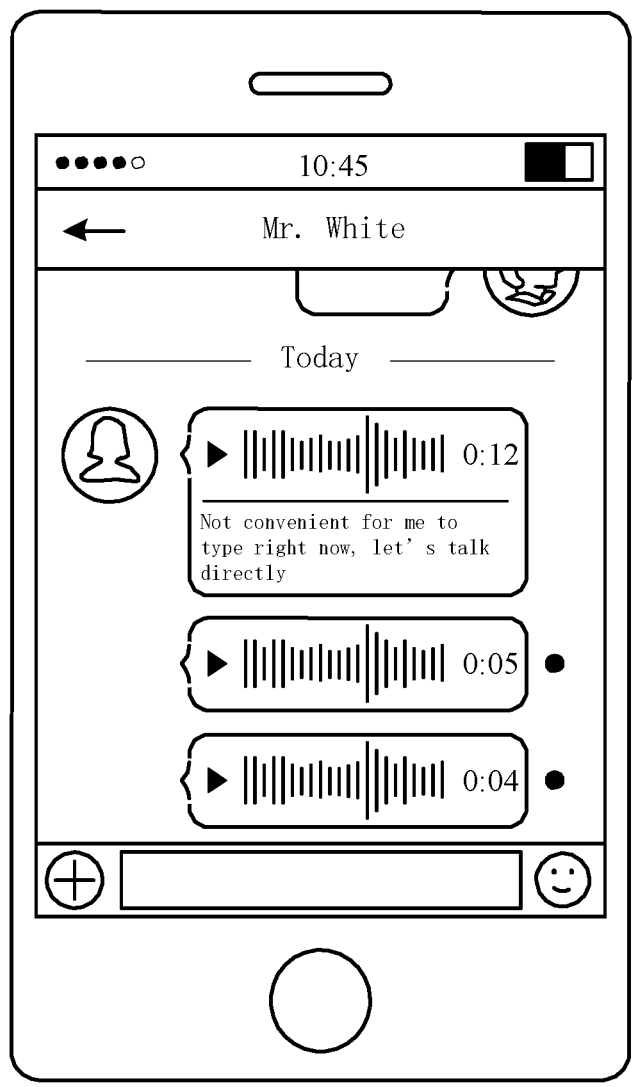

After the electronic device utilized by user "Mr. Black" receives the text content returned by the server, the display region of the corresponding audio message may be expanded; herein, the display region after expansion has been divided into a first region and a second region; the first region is operative to show the corresponding audio message, and the second region is operative to show the text content pertaining to the audio message. As illustrated by FIG. 7, suppose that there are three audio messages in total, and user "Mr. Black" has triggered the uppermost audio message, such that the display region (the display region may be a "bubble box" format as illustrated by FIG. 7; of course, the present disclosure is not limiting in this regard) pertaining to the audio message may be expanded downward, such that the display region after expansion is divided into an upper region equivalent to the first region, and a lower region equivalent to the second region, wherein the upper region is operative to display a schematic icon of the audio message, and the lower region is operative to display the text content pertaining to the audio message, such as "Not convenient for me to type right now, let's talk directly" and the like. Of course, persons skilled in the art may utilize other methods to perform functional division upon an expanded region, and the present disclosure shall not be limiting thereto.

According to another example embodiment, example embodiments of the present disclosure may include the above-mentioned step 410; correspondingly, according to technical solutions of the present disclosure, a server may determine the response statuses of communication messages transmitted between communicating counterparties; thus, targeting the above-mentioned audio message, upon receipt of the audio conversion request initiated by any communicating party targeting the audio message, if another message related to the any communicating party has a non-responded response status, and the other message is of an audio type, the server in step 412 aside from returning text content pertaining to the above-mentioned audio message, may also return text content pertaining to the other message. Of course, text content pertaining to the other message, is also acquired through the server proactively, obtained in advance through performing conversion processing, without the need for a communicating party to wait for the server to execute conversion in real time.

Figure 8:
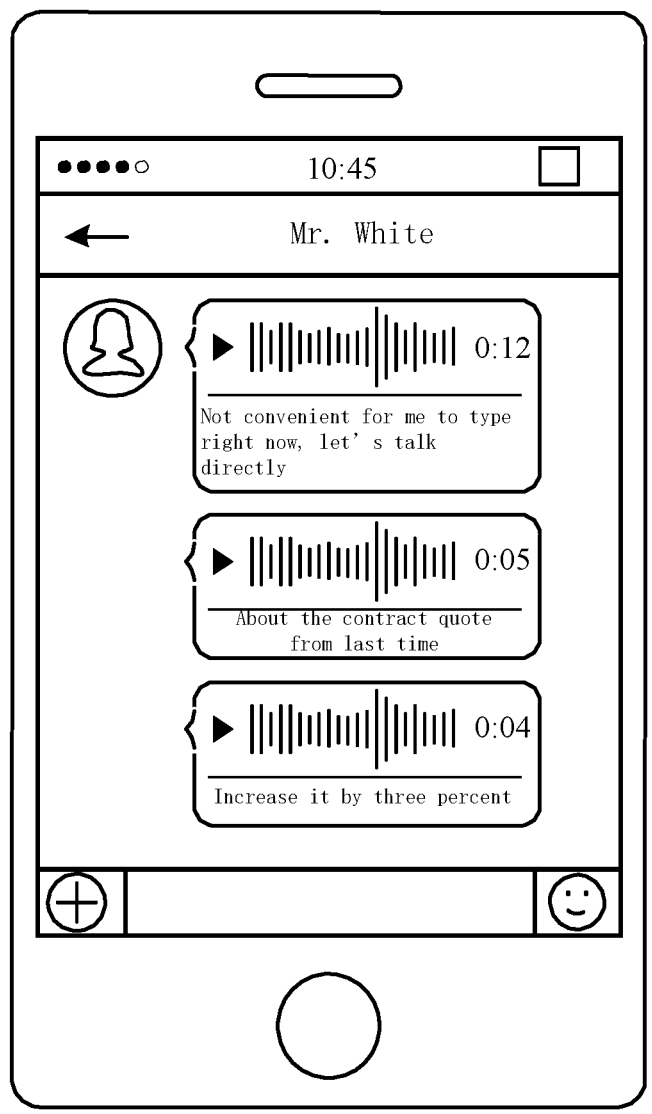

Thus, as illustrated by FIG. 5, when user "Mr. Black" triggers initiating an audio conversion request targeting the first audio message, if at the same time a second audio message and a third audio message exist, and both have non-responded statuses, then without needing user "Mr. Black" to manually initiate audio conversion requests one by one, the server may proactively send text content pertaining to all three audio messages; correspondingly, as illustrated by FIG. 8, the electronic device utilized by user "Mr. Black" may respectively perform expansion upon the display regions of the three audio messages, and show corresponding text content, including "Not convenient for me to type right now, let's talk directly," "About the contract quote from last time," "Increase it by three percent" and the like. In one aspect, triggering operations (that is, issuing audio conversion commands, or initiating audio conversion requests) of user "Mr. Black" may be simplified, and through a single trigger viewing of all non-responded audio messages may be realized, and in another aspect user "Mr. Black" may be helped to simultaneously view multiple non-responded audio messages, which compared to separately individually viewing text content pertaining to each audio message, evidently possesses better readability and coherence for reading, facilitates user "Mr. Black" in understanding the communication intent of user "Mr. White," and effectively increases the communication efficiency.

According to another example embodiment, aside from the server through step 410 and the like determining response status of each communication message, a receiving party may determine and process the response status of each communication message. For example, the electronic device utilized by the receiving party may determine the response statuses of each communication message of an audio type already received by the receiving party; herein, upon receipt of the audio conversion command targeting any audio message issued by the receiving party, if there exist non-responded communication messages of an audio type aside from the any audio message, then when the electronic device initiates an audio conversion request to the server, the audio conversion request is not only related to the any audio message (which may be utilized to acquire text content pertaining to the any audio message), but is also related to the other non-responded communication messages (which may be utilized to acquire text content pertaining to the other non-responded communication messages). For example, after user "Mr. Black" triggers the first audio message of FIG. 5 on the electronic device, the electronic device detects that the second audio message and the third audio message also exist, and the response statuses of the two audio messages are non-responded, such that the electronic device initiates audio conversion requests targeting the three audio messages to the server, thereby simultaneously acquiring text content of the three audio messages returned by the server, and through the method illustrated by FIG. 8 displays the text content, which may refer to the above-mentioned example embodiments, which shall not be repeated herein.

Step 416, the server notifying a sending party of the responded status of the audio messages.

According to the present example embodiment, as illustrated by FIG. 5, a black circular dot may be displayed near a communication message to indicate its non-responded response status. After user "Mr. Black" triggers the first audio message and issues a corresponding audio conversion request, the electronic device of user "Mr. Black" may decide that the audio message is being responded to, and as illustrated by FIG. 7 remove the black circular dot near the first audio message.

Figure 9:
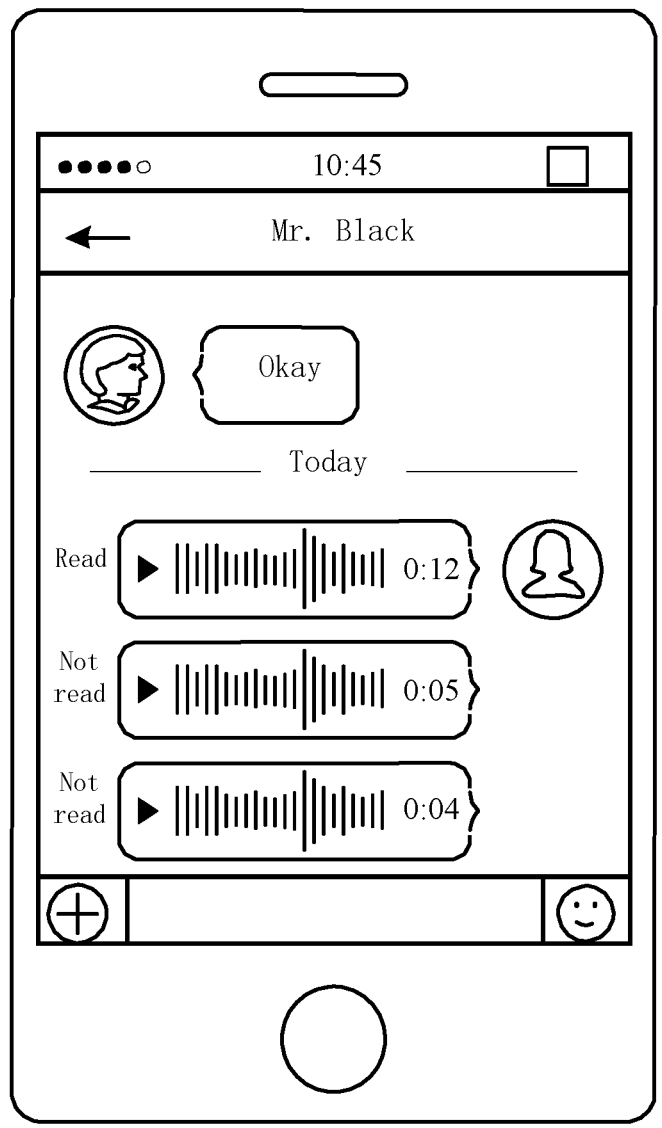
FIG. 9 is an interface diagram of a communication application based on a sending party end provided according to an example embodiment of the present disclosure.

At the same time, as illustrated by FIG. 9, after user "Mr. White" issues each communication message, the electronic device of user "Mr. White" separately shows response statuses near each communication message, such as "Read" pertaining to a responded status, and "Not read" pertaining to a non-responded status. Thus, after the server receives a voice conversion request of user "Mr. Black" targeting a first audio message, and returns the converted corresponding text content to user "Mr. Black," it may decide to switch the audio message from a non-responded status to a responded status, and notify the responded status to the sending party who is user "Mr. White," thereby "Read" is shown near the first audio message of FIG. 9, and "Not read" is shown near the second and the third audio messages. Of course, pertaining to the example embodiment illustrated by FIG. 8, although user "Mr. Black" initiated an audio conversion request targeting the first audio message, when the server returns text content pertaining to all three audio messages, the server may consider that the three audio messages correspond to a responded status, and notify the electronic device of user "Mr. White," causing "Read" to be shown near the three audio messages.

Figure 10:
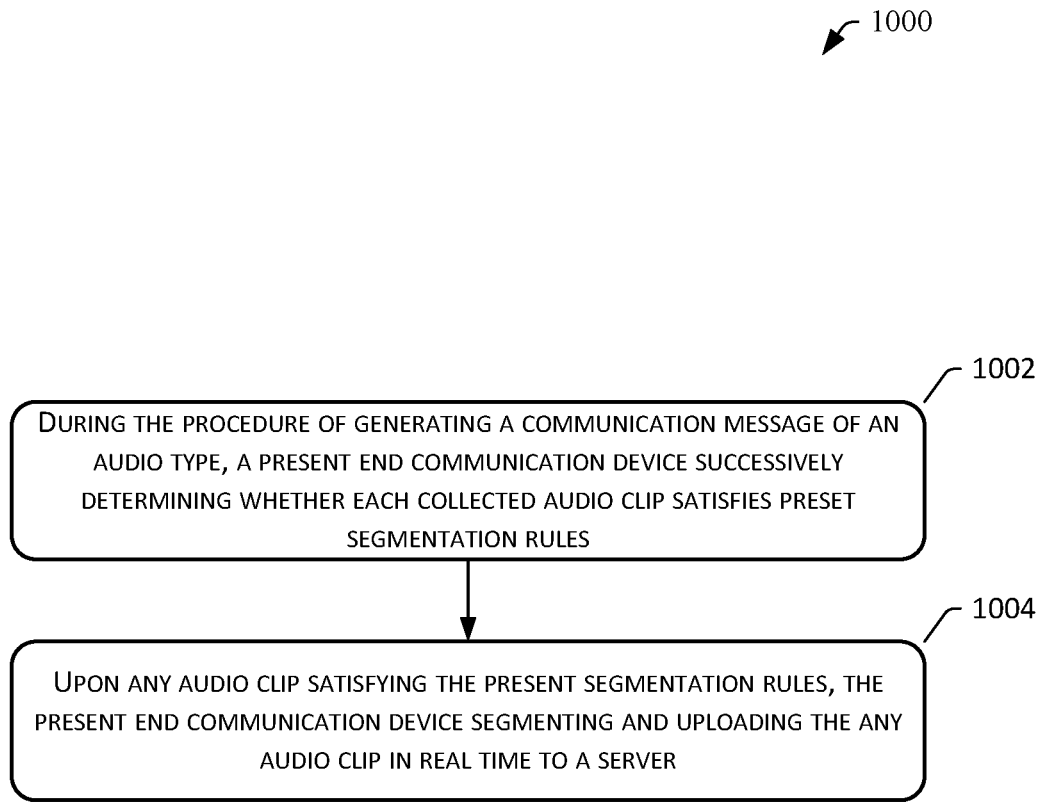
FIG. 10 is a flowchart of an audio message processing method based on a communication device end provided according to a third example embodiment of the present disclosure.

FIG. 10 is a flowchart of an audio message processing method 1000 based on a communication device end provided by a third example embodiment of the present disclosure, where as illustrated by FIG. 10, the method 1000 may include:

Step 1002, during the procedure of generating a communication message of an audio type, a present end communication device successively determining whether each collected audio segment satisfies preset segmentation rules.

Step 1004, upon any audio segment satisfying the preset segmentation rules, the present end communication device segmenting and uploading the any audio segment in real time to a server.

According to the present example embodiment, the server successively receives the audio segments segmented and uploaded in real time according to preset rules, and respectively converts each audio segment to corresponding text fragments; then, the server combines all text fragments successively, resulting in text content pertaining to the entire audio message.

According to the present example embodiment, a segmentation rule may utilize various fashions, such as one or a combination of several among multiple dimensions such as based on time length, based on data quantity of an audio segment, and the like. By way of example, when a segmentation rule based on time length is utilized, suppose that the entire audio message is 12 seconds, and the preset segmentation time length is 2 seconds, such that upon reaching 2 seconds a real-time segmentation operation may be executed, and the 2-second audio segment is uploaded to the server, and the server may immediately execute pre-conversion processing to obtain a corresponding text fragment; thus, the entire audio may result in 6 audio segment in total, with 6 corresponding text fragments, and then the server combine them into text content pertaining to the entire audio message.

According to the present example embodiment, through the electronic device (that is, the above-mentioned present end communication device) of the sending party performing real-time segmentation and uploading upon the audio message, causing, at the same time that the sending party is inputting the audio message, the server to be able to acquire corresponding audio segments almost without delay, and immediately execute pre-conversion processing for each audio segment, which, compared to uploading to the server the audio message in its entirety after inputting, may enable the server to more quickly complete pre-conversion processing upon the audio message and acquire corresponding text content, so that even if the receiving party initiates an audio conversion request immediately after receiving the audio message, the server may still ensure that pre-conversion processing is completed prior to receiving the audio conversion request, and after receiving an audio conversion request corresponding text content is returned immediately, so that the communicating counterparties during the communication procedure may, through audio input, avoid the problems of low efficiency and input errors while manually typing, and the problem of delayed waiting while audio is converted to text is solved, and at the same time both speed and convenience of audio input and non-delay of text communication are taken care of, effectively improving the communication efficiency between communicating counterparties.

Figure 11:
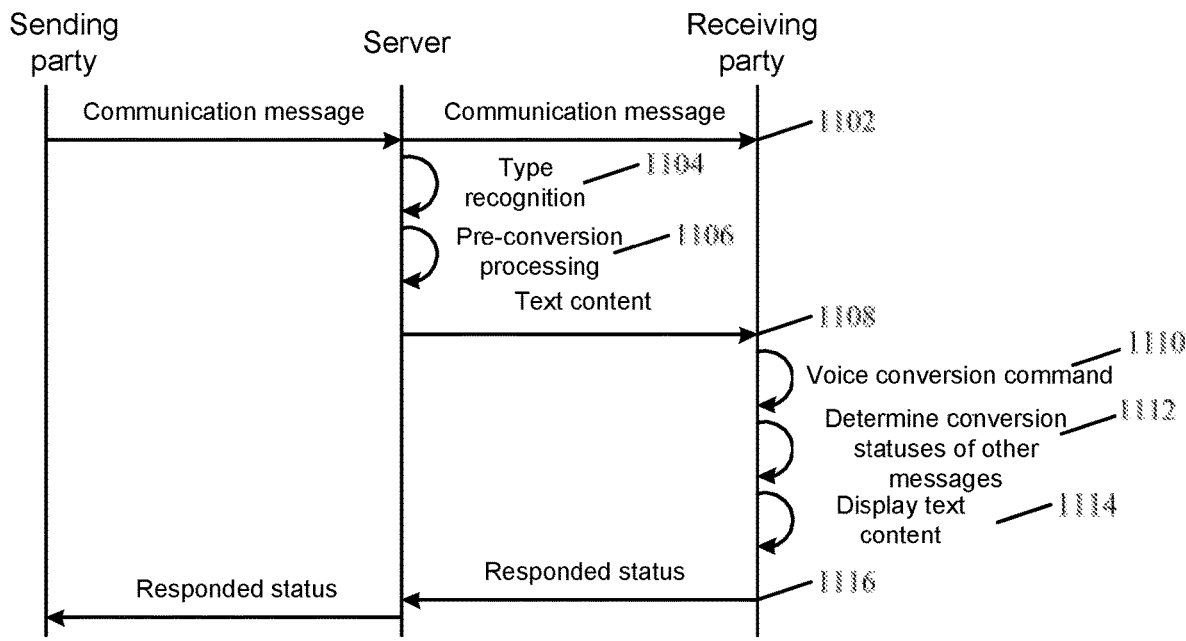
FIG. 11 is a flowchart of another audio message processing method provided according to an example embodiment of the present disclosure.

FIG. 11 is a flowchart of another audio message processing method 1100 according to an example embodiment of the present disclosure, as illustrated by FIG. 11, the method 1100 may include the following steps:

Step 1102, the server acquiring a communication message transmitted between communicating counterparties.

Step 1104, the server performing type recognition upon the communication message.

Step 1106, the server performing pre-conversion processing upon audio-type communication message (that is, an audio message) to obtain corresponding text content.

According to the present example embodiment, steps 1102-1106 may refer to steps 402-406 according to the example embodiment illustrated by FIG. 4, which shall not be repeated herein.

Step 1108, the server sending the text content pertaining to the audio message to the receiving party.

According to the present example embodiment, the server defaults to an audio conversion request of the receiving party existing for all audio messages, thereby not only through pre-conversion processing obtaining text content pertaining to all audio messages, but also proactively pushing the text content to the receiving party.

Step 1110, the communication device of the receiving party receiving an audio conversion command of the receiving party targeting the audio message.

Step 1112, the communication device of the receiving party determining response statuses of other audio messages.

Step 1114, the communication device of the receiving party displaying the text content.

According to the present example embodiment, before the receiving party initiates an audio conversion command, the server has already obtained corresponding text content from pre-conversion processing, and proactively pushes to the communication device of the receiving party; in other words, the communication device of the receiving party may be thought of as having already performed "pre-fetching" upon the text content pertaining to the audio message before receiving the audio conversion command. Thus, after the receiving party initiates the audio conversion command, the communication device may immediately acquire and display corresponding text content, without needing the receiving party to wait.

At the same time, compared to the example embodiment illustrated by FIG. 4, the present example embodiment through pre-fetching text content locally to the communication device, enables the communication device to, after receiving an audio conversion command, directly retrieve corresponding text content locally, without the need for an Internet environment. Thereby, with regard to some settings, such as when a user wishes to perform text conversion upon audio messages among historical communication messages in an environment without the Internet, FIG. 11 may still satisfy the user's needs without needing Internet support.

According to the present example embodiment, similar to step 410 as illustrated by FIG. 4, aside from audio messages for which the receiving party directly initiates audio conversion commands, if other audio messages exist with non-responded statuses, the communication device may together display the text contents of these audio messages, not to be repeated herein.

Step 1116, the communication device of the receiving party having executed marking the audio messages displayed by the text content as responded statuses, notifying the server of the responded statuses, the server then notifying the sending party.

According to the present example disclosure, the communication device may add the responded statuses of the audio messages to a response status switching notification, and send the response status switching notification to the server, the server in turn forwarding to the sending party, and thereby on the communication device of the sending party the corresponding audio messages undergo correct marking.

Figure 12:
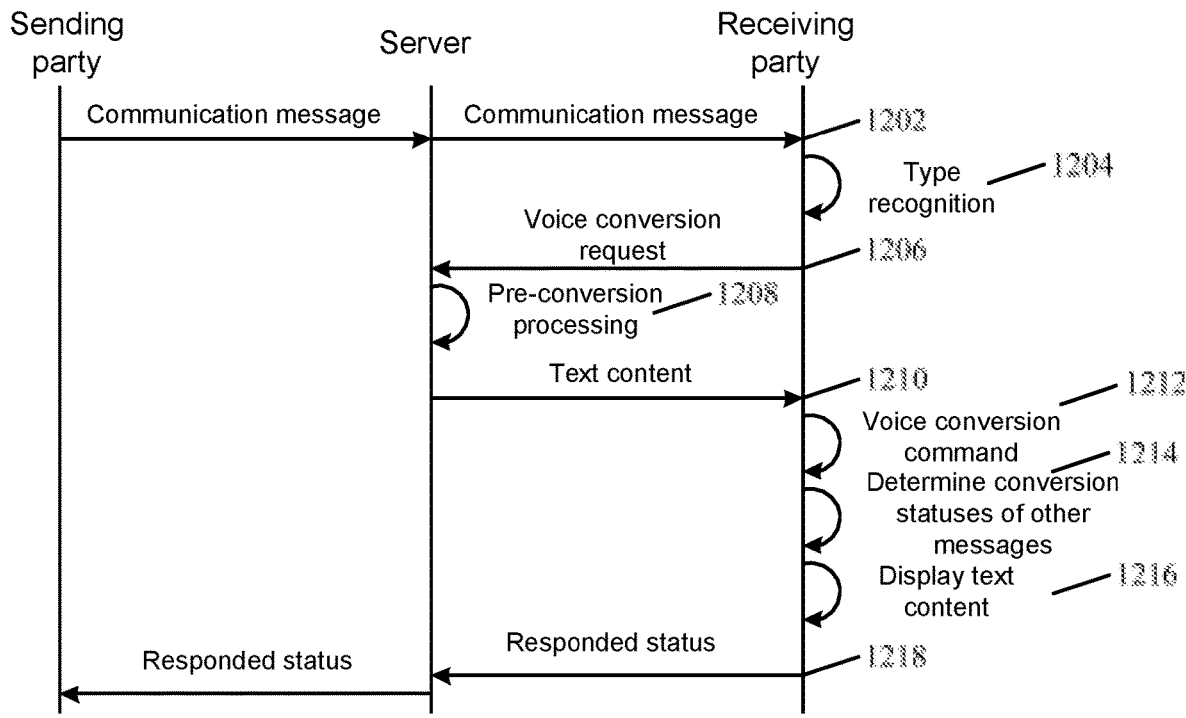
FIG. 12 is a flowchart of still another audio message processing method provided according to an example embodiment of the present disclosure.

FIG. 12 is a flowchart of still another audio message processing method 1200 provided by an example embodiment of the present disclosure, as illustrated by FIG. 12, the method 1200 may include the following steps:

Step 1202, the communicating counterparties executing communication message receiving and transmitting operations.

Step 1204, a communication device of the receiving party performing type recognition upon communication messages.

Step 1206, upon recognizing an audio message, the communication device of the receiving party initiating an audio conversion request to a server.

Step 1208, the server performing pre-conversion processing upon communication messages of an audio type (that is, audio messages) to obtain corresponding text content.

Step 1210, the server sending the text content pertaining to the audio messages to the receiving party.

According to the present example embodiment, an audio conversion request is initiated by a communication device on a proactive basis to the server, and not initiated based on an audio conversion command issued by the receiving party; in other words, before the receiving party actually issues an audio conversion command, the communication device, through proactively initiating an audio conversion request to the server, causes the server to execute pre-conversion processing to obtain corresponding text content, so that the communication device realizes "pre-fetching" operations upon text content pertaining to audio messages. Thereby, after the receiving party initiates an audio conversion command, the communication device may immediately acquire and display corresponding text content, without needing the receiving party to wait.

At the same time, compared to the example embodiment illustrated by FIG. 11, the communication device according to the present example embodiment through performing type recognition upon communication messages, proactively initiates an audio conversion request to a server, triggering the server to execute pre-conversion processing, and not the server starting pre-conversion processing by itself, thereby causing the communication device to share the execution procedures of the "type recognition" function, lowering processing load of the server.

Step 1212, the communication device of the receiving party receiving an audio conversion command of the receiving party targeting the audio message.

Step 1214, the communication device of the receiving party determining the response statuses of other audio messages.

Step 1216, the communication device of the receiving party displaying the text content.

Step 1218, the communication device of the receiving party executing marking the audio messages displayed by the text content as a responded status, and notifying the server of the responded status, and the server notifying a sending party.

According to the present example embodiment, steps 1212-1218 may refer to steps 1110-1116 according to the example embodiment illustrated by FIG. 11, not to be repeated herein.

Figure 13:
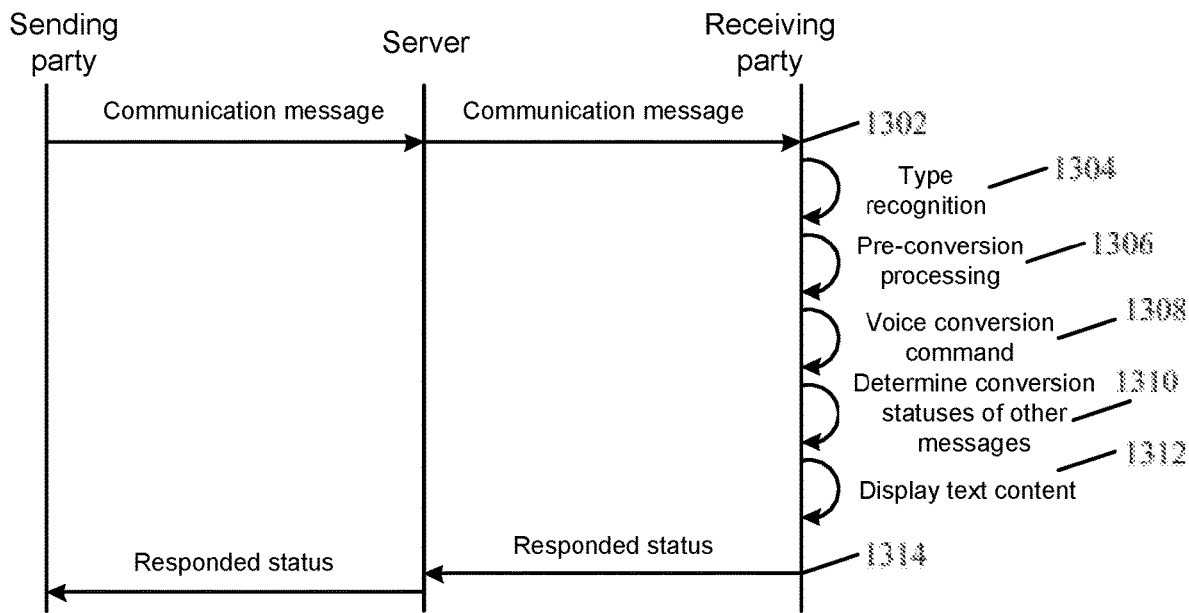
FIG. 13 is a flowchart of still another audio message processing method provided according to an example embodiment of the present disclosure.

FIG. 13 is a flowchart of still another audio message processing method 1300 provided by an example embodiment of the present disclosure, as illustrated by FIG. 13, the method 1300 may include the following steps:

Step 1302, the communicating counterparties executing communication message receiving and transmitting operations.

Step 1304, the communication device of the receiving party performing type recognition upon communication messages.

Step 1306, upon recognizing an audio message, the communication device of the receiving party performing pre-conversion processing upon the communication message of an audio type (that is, an audio message), resulting in corresponding text content.

According to the present example embodiment, the communication device of the receiving party proactively recognizes the type of communication messages, and upon determining an audio message, also proactively completes pre-conversion processing of the audio message to obtain corresponding text content. Thus, when the network environment is poor or there is no network, the communicating device of the receiving party may still "pre-fetch" text content of an audio message, so that when the receiving party issues an audio conversion command, the text content may be promptly displayed, avoiding waiting by the receiving party.

When the network environment is unstable, after the communication device receives an audio message, if execution of pre-conversion processing is dependent on the server, the network environment being unstable may cause the communication device to be unable to successfully initiate an audio conversion request to the server, or the server to be unable to successfully send text content from pre-conversion processing to the communication device, which may cause the communication device to be unable to pre-fetch corresponding text content before the receiving party initiates an audio conversion command, creating the need for the receiving party to initiate an audio conversion request to the server in real time, undoubtedly increasing wait times for users.

In reality, when the network environment is unstable, through pre-conversion processing (or pre-fetching) solutions provided by any embodiment of the present disclosure, regardless of whether pre-conversion processing of audio messages is performed at the server or the communication device, the user experience of a user can be optimized. For example, when pre-conversion processing is realized on a server, through pre-fetching text content, before a user initiates an audio conversion command, the server and the communication device may obtain more time and opportunities to transmit the text content, avoiding a situation where network connectivity causes text content to be non-transmittable or transmission failures to repeatedly appear when the user requests conversion in real time.

Step 1308, the communication device of the receiving party receiving an audio conversion command of the receiving party targeting any audio message.

Step 1310, the communication device of the receiving party determining the response statuses of other audio messages.

Step 1312, the communication device of the receiving party displaying the text content.

Step 1314, the communication device of the receiving party executing marking the audio messages displayed by the text content as a responded status, and notifying the responded status to a server, and the server notifying a sending party.

According to the present example embodiment, steps 1308-1314 may reference steps 1110-1116 according to the example embodiment illustrated by FIG. 11, which shall not be repeated herein.

Figure 14:
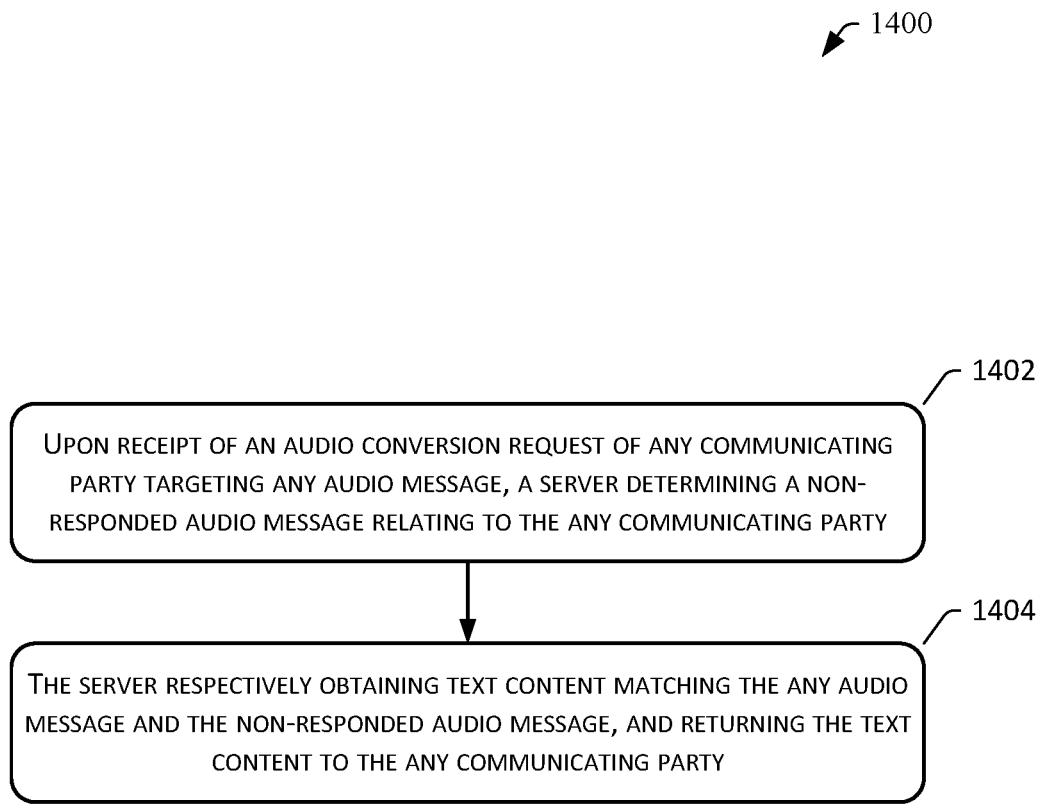
FIG. 14 is a flowchart of another audio message processing method based on a server end provided according to an example embodiment of the present disclosure.

FIG. 14 is a flowchart of an audio message processing method 1400 based on a server end provided by an example embodiment of the present disclosure, as illustrated by FIG. 14, the method 1400 utilizing a server may include the below steps:

Step 1402, upon receipt of an audio conversion request of any communicating party targeting any audio message, a server determining a non-responded audio message relating to the any communicating party.

Step 1404, the server respectively obtaining text content pertaining to the any audio message and the non-responded audio message, and returning the text content to the any communicating party.

According to the present example embodiment, the server, upon receipt of the audio conversion request targeting the any audio message, proactively associates other non-responded audio messages, without needing a user to initiate audio conversion respectively targeting each audio message, and text content pertaining to all non-responded audio messages may be acquired, thereby greatly simplifying user operations. Especially, when it is not easy for a user to trigger audio conversion commands for audio messages, such as when a user is carrying heavy objects in one hand and can only operate using the other hand, through technical solutions of the present disclosure, the user only needs to initiate an audio conversion command for a single audio message, and text content pertaining to all audio messages may be acquired; again, when content relevance is comparatively large among multiple audio messages, through proactively presenting text content of multiple audio messages to the user, users are facilitated in mutual collaboration with the contents and logic of multiple audio messages, helping to increase reading and communication efficiency.

In a situation according to the present example embodiment, a server may perform pre-conversion upon all audio messages to obtain corresponding text content, and upon receipt of the audio conversion request, the server need only respectively look up the pre-converted text content pertaining to the above-mentioned any audio message and non-responded audio messages; technical solutions under this situation may refer to step 410 and the like according to the example embodiment illustrated by FIG. 4, which shall not be repeated herein.

In another situation according to the present example embodiment, the server may, after receiving an audio conversion request, respectively convert the any audio message and the non-responded audio messages to pertinent text content, and return the text content to the user to be displayed; herein, with regard to conversion processing upon each individual audio message, processing procedures in current technologies may be referred to, which shall not be repeated herein.

Figure 15:
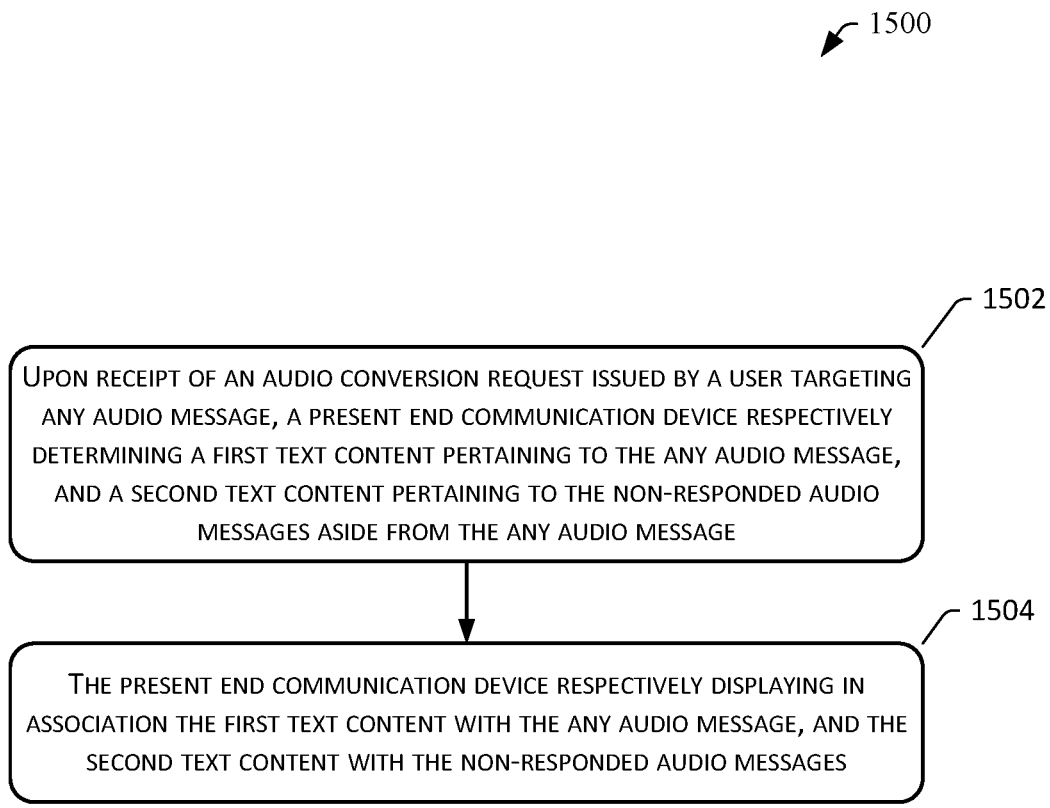
FIG. 15 is a flowchart of an audio message processing method based on a communication device end provided according to a fourth example embodiment of the present disclosure.

FIG. 15 is a flowchart of an audio message processing method 1500 based on a communication device end provided by an example embodiment of the present disclosure, as illustrated by FIG. 15, the method 1500 utilizing a communication device may include the below steps:

Step 1502, upon receipt of an audio conversion command issued by a user targeting any audio message, a present end communication device respectively determining a first text content pertaining to the any audio message, and a second text content pertaining to non-responded audio messages aside from the any audio message.

Step 1504, the present end communication device respectively displaying in association the first text content with the any audio message, and the second text content with the non-responded audio messages.

According to the present example embodiment, similar to the example embodiment illustrated by FIG. 14, upon the communication device receiving an audio conversion command, aside from the any audio message targeted by the audio conversion command, the communication device also proactively determines non-responded audio messages not targeted by the audio conversion command, and through a first text content and a second content pertaining to these two respectively being displayed, user operation is simplified, helping to improve reading and communication efficiency, not further detailed herein.

In an aspect, with regard to the conversion timing of the audio messages, the communication device may, before receiving the audio conversion command, pre-fetch the first text content and the second text content, where this process may refer to step 302 according to the example embodiment illustrated by FIG. 3, not to be detailed herein; or, the communication device may, after receiving the audio conversion command, fetch the first text content and the second text content in real time.

In another aspect, whether utilizing pre-fetching or real-time fetching, the communication device may fetch the first text content and the second text content through either below-mentioned method:

Under a first method, the communication device may proactively convert the any audio message and the non-responded audio messages to the first text content and the second text content; when the communication device utilizes a pre-conversion processing method, the procedure is similar to step 1306 according to the example embodiment illustrated by FIG. 13, and is not further detailed herein.

Under a second method, the communication device may initiate an audio conversion request to the server, and obtain the first text content and the second text content returned by the server. Herein, the first text content and the second text content may result from real-time conversion by the server based on an audio conversion request, that is, the server only executes audio conversion operations after receiving an audio conversion request, the procedure being similar to step 1208 according to the example embodiment illustrated by FIG. 12, and is not further detailed herein; or, the first text content and the second text content may result from pre-conversion by the server, the procedure being similar to step 406 according to the example embodiment illustrated by FIG. 4, and is not further detailed herein.

Figure 16:
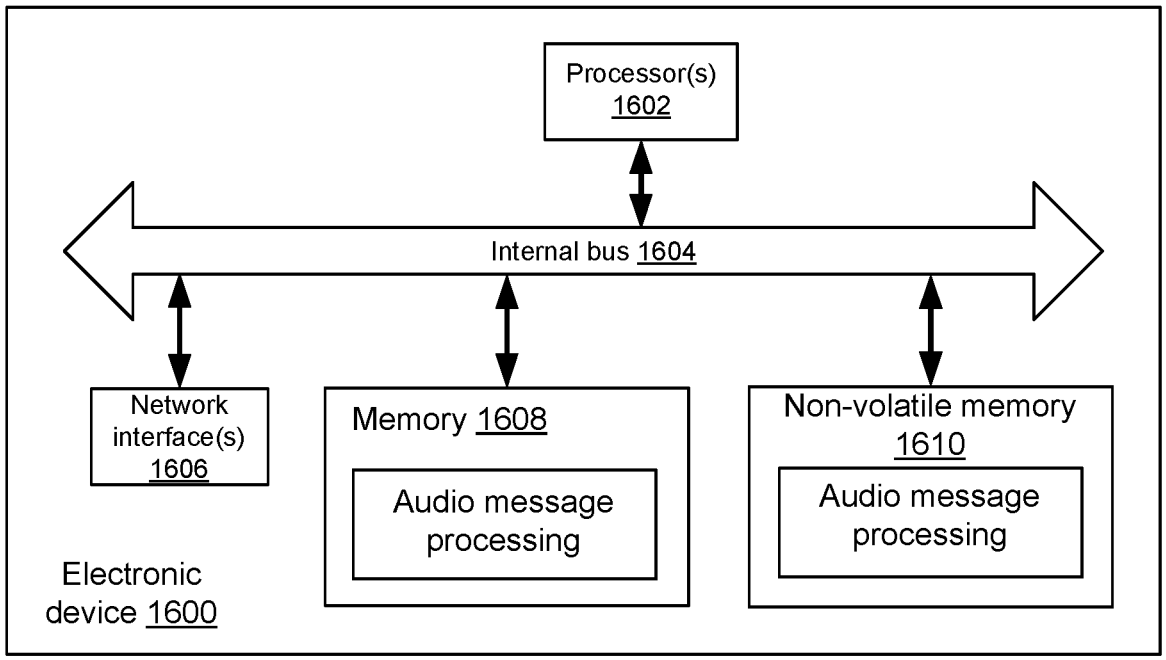
FIG. 16 is a schematic of an electronic device provided according to an example embodiment of the present disclosure.

FIG. 16 illustrates a schematic of an electronic device 1600 of an example embodiment of the present disclosure. Referring to FIG. 16, at the hardware layer, the electronic device includes one or more processors 1602, an internal bus 1604, one or more network interfaces 1606, memory 1608 and non-volatile memory 1610, and may of course also include other hardware needed by other services. The one or more processors 1602 reads pertinent computer program instructions from the non-volatile memory 1610 into memory 1608 and then runs them, at the logical level forming an audio message processing apparatus. Of course, aside from software implementation methods, the present disclosure does not exclude other implementation methods, such as logical devices or methods combining hardware and software and the like, which is to say that the execution entity of the following processing flow is not limited to individual logical units, and may be hardware or logical devices.

Figure 17:
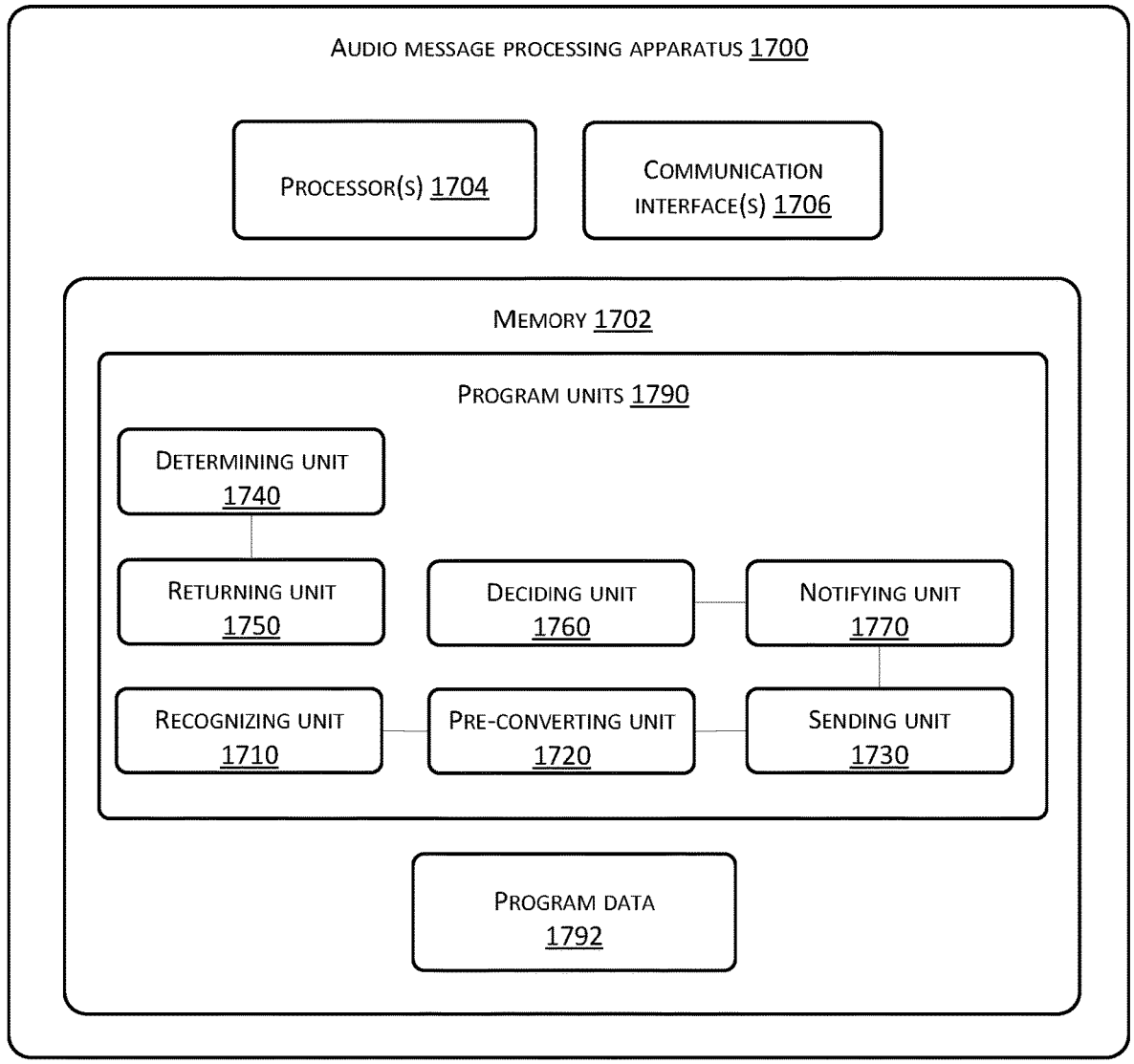
FIG. 17 is a block diagram of an audio message processing apparatus based on a server end provided according to an example embodiment of the present disclosure.

According to an example embodiment, referring to FIG. 17, an audio message processing apparatus 1700 may include: memory 1702, one or more processors 1704, and one or more communication interfaces 1706. The audio message processing apparatus 1700 may further include a recognizing unit 1710, a pre-converting unit 1720 and a sending unit 1730. Herein:

Memory 1702 is operative to store program instructions and/or data.

One or more processors 1704, through reading program instructions and/or data stored on memory 1702, is operative to execute processes as follows:

The recognizing unit 1710 is stored in the memory 1702 and executable by the one or more processors 1704 to cause the one or more processors 1702 of a server to recognize the types of communication messages transmitted between communicating counterparties;

The pre-converting unit 1720 is stored in the memory 1702 and executable by the one or more processors 1704 to cause the one or more processors 1702 of the server to, when the type of any communication message is an audio type, acquire the any communication message, and pre-convert the any communication message to corresponding text content;

The sending unit 1730 is stored in the memory 1702 and executable by the one or more processors 1704 to cause the one or more communication interfaces 1706 of the server to, upon a determination by the one or more processors 1704 that any communicating party has a conversion need for the any communication message, send the text content to the any communicating party.

Optionally, the sending unit 1730 is executable by the one or more processors 1704 to:

Cause the one or more processors 1704 of the server to, when the any communicating party in the communication procedure belongs to a preset communication role, decide that the any communicating party has the conversion need, and cause the one or more communication interfaces 1706 to send the text content.

Optionally, the sending unit 1730 is executable by the one or more processors 1704 to:

Cause the one or more processors 1704 of the server to, upon receipt by the one or more communication interfaces 1706 of an audio conversion request of the any communicating party targeting the any communication message, decide that the any communicating party has the conversion need, and cause the one or more communication interfaces 1706 to return pre-converted text content pertaining to the any communication message to the any communicating party.

Optionally, the apparatus 1700 further includes:

A determining unit 1740 stored in the memory 1702 and executable by the one or more processors 1704 to cause the one or more processors 1704 of the server to determine the response statuses of the communicating counterparties for transmitted communication messages.

A returning unit 1750 stored in the memory 1702 and executable by the one or more processors 1704 to cause the one or more communication interfaces 1706 of the server to, upon receipt of an audio conversion request of any communicating party targeting the any communication message, if there exist non-responded communication messages of an audio type relating to the any communicating party, further return pre-converted text content pertaining to all non-responded communication messages of an audio type to the any communicating party.

Optionally, the apparatus 1700 further includes:

A deciding unit 1760 stored in the memory 1702 and executable by the one or more processors 1704 of the server to cause the one or more processors 1704 to, after the pre-converted text content pertaining to the any communication message is returned to the any communicating party, decide to switch the any communication message to a responded status;

A notifying unit 1770 stored in the memory 1702 and executable by the one or more processors 1704 to cause the one or more communication interfaces 1706 of the server to notify a sending party of the any communication message of the responded status.

Optionally, the pre-converting unit 1720 is executable by the or more processors 1704 to:

Cause the one or more communication interfaces 1706 of the server to successively receive audio segments segmented and uploaded in real time based on preset rules by the communicating party, and cause the one or more processors 1704 to respectively pre-convert each audio segment to a corresponding text fragment;

The one or more processors 1704 of the server successively combining all text fragments to obtain the text content.

In implementations, the memory 1702 may include program units 1790 and program data 1792. The program units 1790 may include one or more of the units as described in above.

Figure 18:
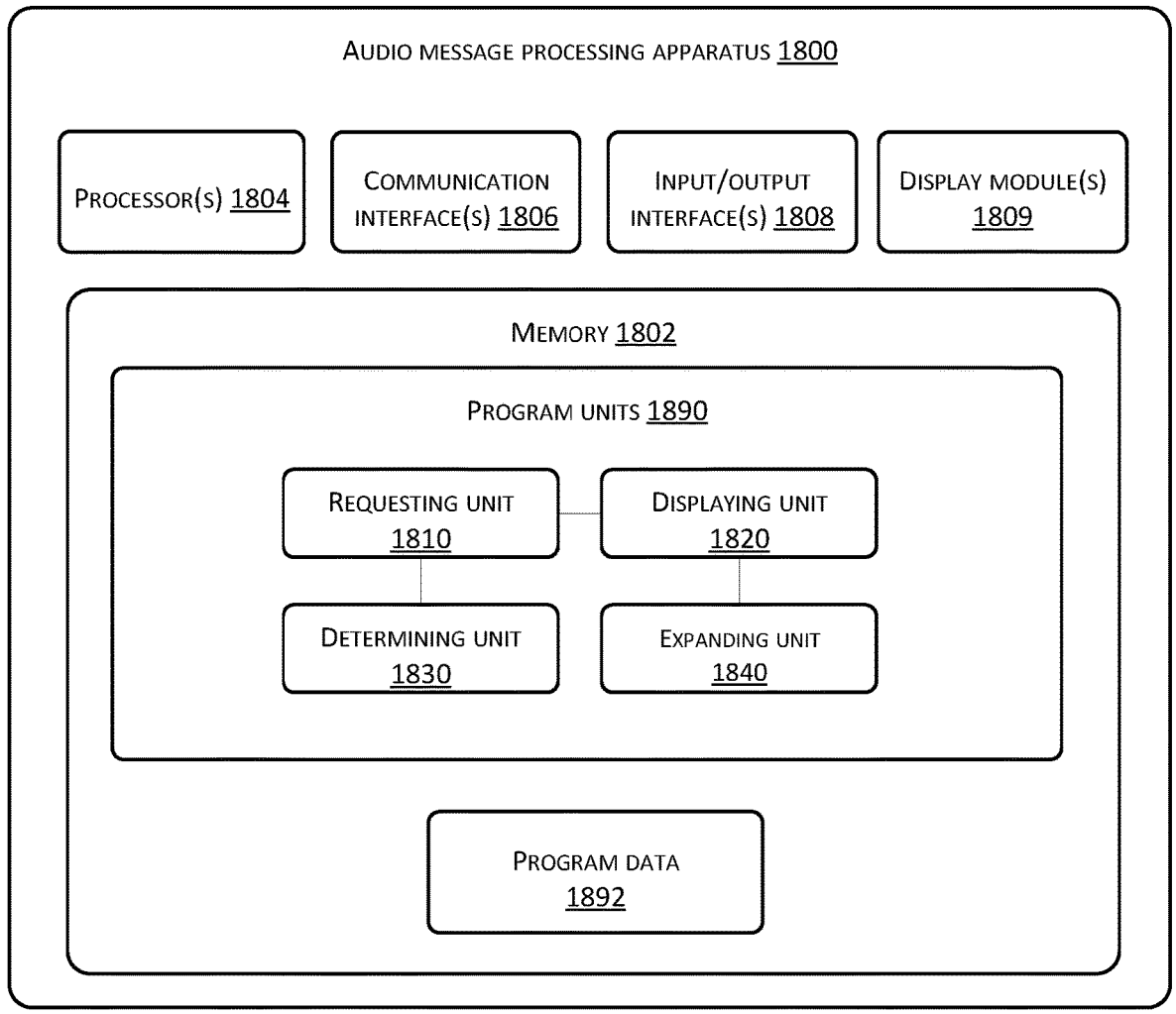
FIG. 18 is a block diagram of an audio message processing apparatus based on a communication device end provided according to a first example embodiment of the present disclosure.

According to an example embodiment, referring to FIG. 18, an audio message processing apparatus 1800 may include: memory 1802, one or more processors 1804, one or more communication interfaces 1806, one or more input/output interfaces 1808, and one or more display modules 1809. The audio message processing apparatus 1800 may further include a requesting unit 1810 and a displaying unit 1820. Herein:

Memory 1802 is operative to store program instructions and/or data.

One or more processors 1804, through reading program instructions and/or data stored on memory 1802, is operative to execute processes as follows:

The requesting unit 1810 is stored in the memory 1802 and executable by the one or more processors 1804 to cause the one or more communication interfaces 1806 of a present end communication device to, upon receipt of an audio conversion command issued by a user targeting any communication message of an audio type, initiate a corresponding audio conversion request to a server;

The displaying unit 1820 is stored in the memory 1802 and executable by the one or more processors 1804 to cause the one or more communication interfaces 1806 of the present end communication device to receive the text content pertaining to the any communication message returned by the server, and cause the one or more display modules 1809 to display the text content in association with the any communication message; herein, the text content results from proactive pre-conversion by the server before the audio conversion request is received.

Optionally, the apparatus 1800 further includes:

A determining unit 1830 stored in the memory 1802 and executable by the one or more processors 1804 to cause the one or more processors 1804 of the present end communication device to determine the response statuses of the user for the already received communication messages of an audio type;

Herein, upon receipt by the one or more communication interfaces 1806 of the audio conversion command issued by the user targeting the any communication message, if non-responded communication messages of an audio type exist aside from the any communication message, the audio conversion request is also related to the non-responded communication messages.

Optionally, the apparatus 1800 further includes:

An expanding unit 1840 stored in the memory 1802 and executable by the one or more processors 1804 to cause the one or more processors 1804 of the present end communication device to, after the one or more communication interfaces 1806 receiving text content returned by the server, perform expansion upon the display region of the corresponding communication messages;

Herein, the expanded display region is divided into a first region and a second region; the first region being operative to show a corresponding communication message, and the second region being operative to show text content pertaining to the communication message.

In implementations, the memory 1802 may include program units 1890 and program data 1892. The program units 1890 may include one or more of the units as described in above.

Figure 19:
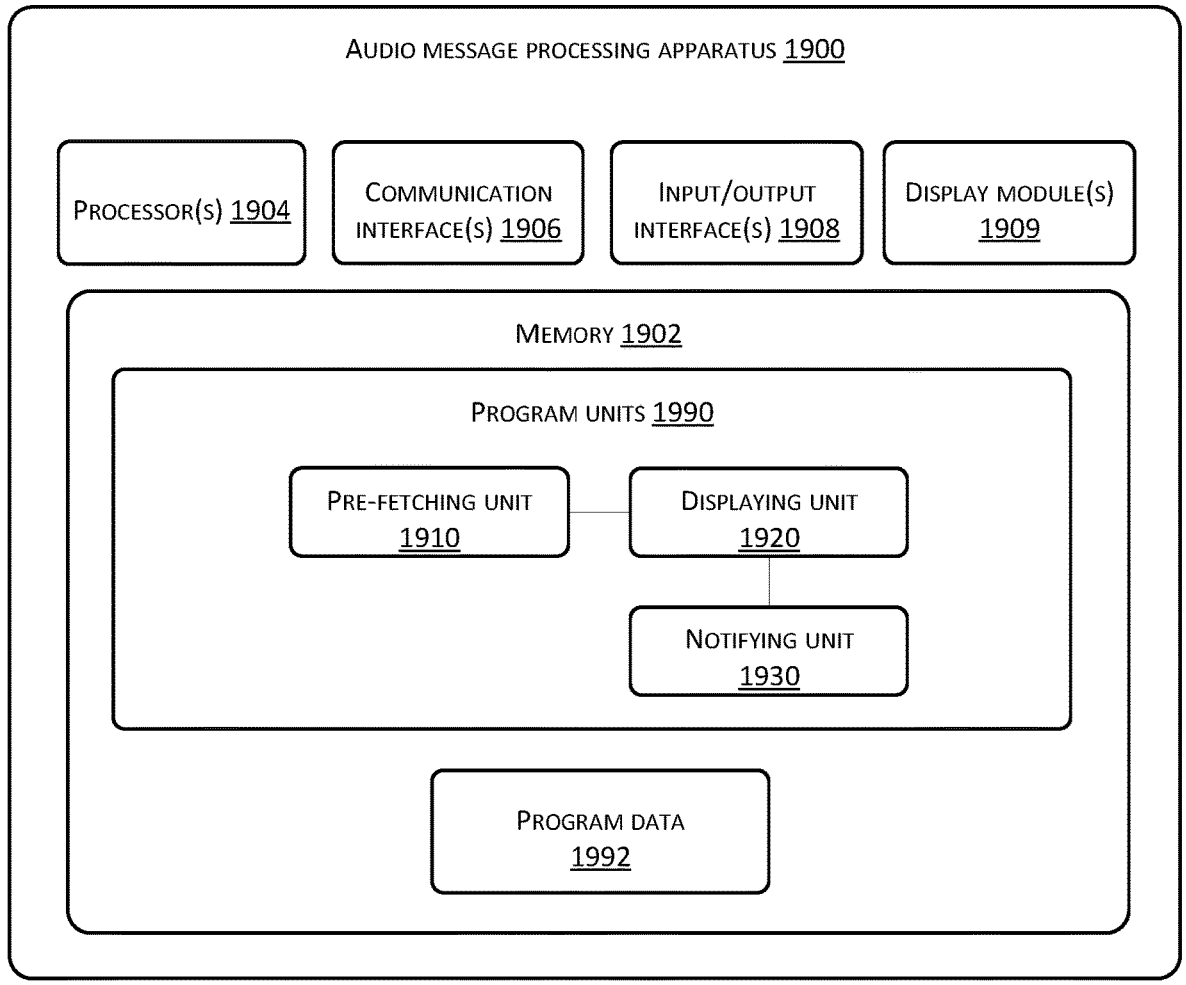
FIG. 19 is a block diagram of an audio message processing apparatus based on a communication device end provided according to a second example embodiment of the present disclosure.

According to an example embodiment, referring to FIG. 19, an audio message processing apparatus 1900 may include: memory 1902, one or more processors 1904, one or more communication interfaces 1906, one or more input/output interfaces 1908, and one or more display modules 1909. The audio message processing apparatus 1900 may further include a pre-fetching unit 1910 and a displaying unit 1920. Herein:

Memory 1902 is operative to store program instructions and/or data.

One or more processors 1904, through reading program instructions and/or data stored on memory 1902, is operative to execute processes as follows:

The pre-fetching unit 1910 is stored in the memory 1902 and executable by the one or more processors 1904 to cause the one or more processors 1904 of a present end communication device to pre-fetch text content pertaining to any communication message of an audio type;

The displaying unit 1920 is stored in the memory 1902 and executable by the one or more processors 1904 to cause the one or more display modules 1909 of the present end communication device to, upon receipt by the one or more communication interfaces 1906 of an audio conversion command issued by a user targeting the any communication message, show the pre-fetched text content.

Optionally, the pre-fetching unit 1910 is executable by the one or more processors 1904 to:

Cause the one or more processors 1904 of the present end communication device to pre-fetch the text content from a server, the text content resulting from pre-conversion by the server;

Or, cause the one or more processors 1904 of the present end communication device to perform pre-conversion processing upon the any communication message to obtain the text content.

Optionally, the pre-fetching unit 1910 is executable by the one or more processors 1904 to:

Cause the one or more communication interfaces 1906 of the present end communication device to receive the text content pushed by a server;

Or, cause the one or more processors 1904 of the present end communication device to, when determining the types of communication messages transmitted with a counterpart communication device, if determining the type of the any communication message to be an audio type, pre-fetch text content pertaining to the any communication message.

Optionally, the displaying unit 1920 is further executable by the one or more processors 1904 to, upon receipt by the one or more communication interfaces 1906 of an audio conversion command issued by the user targeting the any communication message, if there exist other communication messages of an audio type having a non-responded status, further cause the one or more display modules 1909 to respectively show pre-fetched text content pertaining to the other communication messages.

Optionally, the apparatus 1900 further includes:

A notification unit 1930 stored in the memory 1902 and executable by the one or more processors 1904 to cause the one or more communication interfaces 1906 of the present end communication device to, after the one or more display modules 1909 respectively showing pre-fetched text content pertaining to the other communication messages, issue a response status switching notification pertaining to the other communication messages to the server, the server notifying a pertinent sending party of the responded status of the other communication messages.

In implementations, the memory 1902 may include program units 1990 and program data 1992. The program units 1990 may include one or more of the units as described in above.

Figure 20:
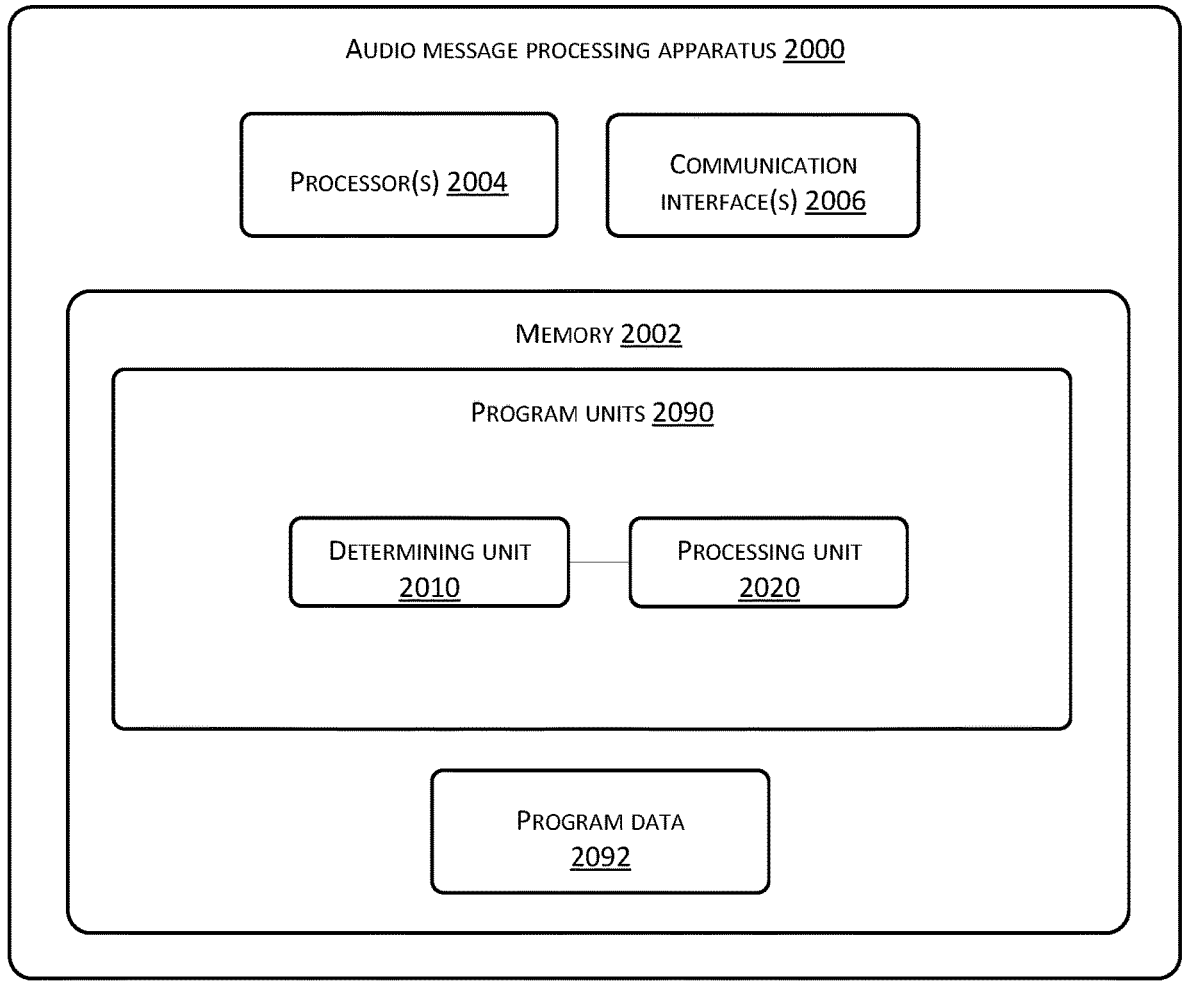
FIG. 20 is a block diagram of an audio message processing apparatus based on a communication device end provided according to a third example embodiment of the present disclosure.

According to an example embodiment, as illustrated by FIG. 20, an audio message processing apparatus 2000 may include: memory 2002, one or more processors 2004, and one or more communication interfaces 2006. The audio message processing apparatus 2000 may further include a determining unit 2010 and a processing unit 2020. Herein:

Memory 2002 is operative to store program instructions and/or data.

One or more processors 2004, through reading program instructions and/or data stored on memory 2002, is operative to execute processes as follows:

The determining unit 2010 is stored in the memory 2002 and executable by the one or more processors 2004 to cause the one or more processors 2004 of the present end communication device to, during the procedure of generating communication messages of an audio type, successively determine whether each already collected audio segment satisfies a preset segmentation rule;

The processing unit 2020 is stored in the memory 2002 and executable by the one or more processors 2004 to cause the one or more processors 2004 of the present end communication device to, upon any audio segment satisfying the preset segmentation rule, segment and upload the any audio segment to a server in real time, the server pre-converting the any audio segment to a corresponding text fragment, text fragments pertaining to all audio segments being successively combined by the server into text content pertaining to the communication message.

In implementations, the memory 2002 may include program units 2090 and program data 2092. The program units 2090 may include one or more of the units as described in above.

Figure 21:
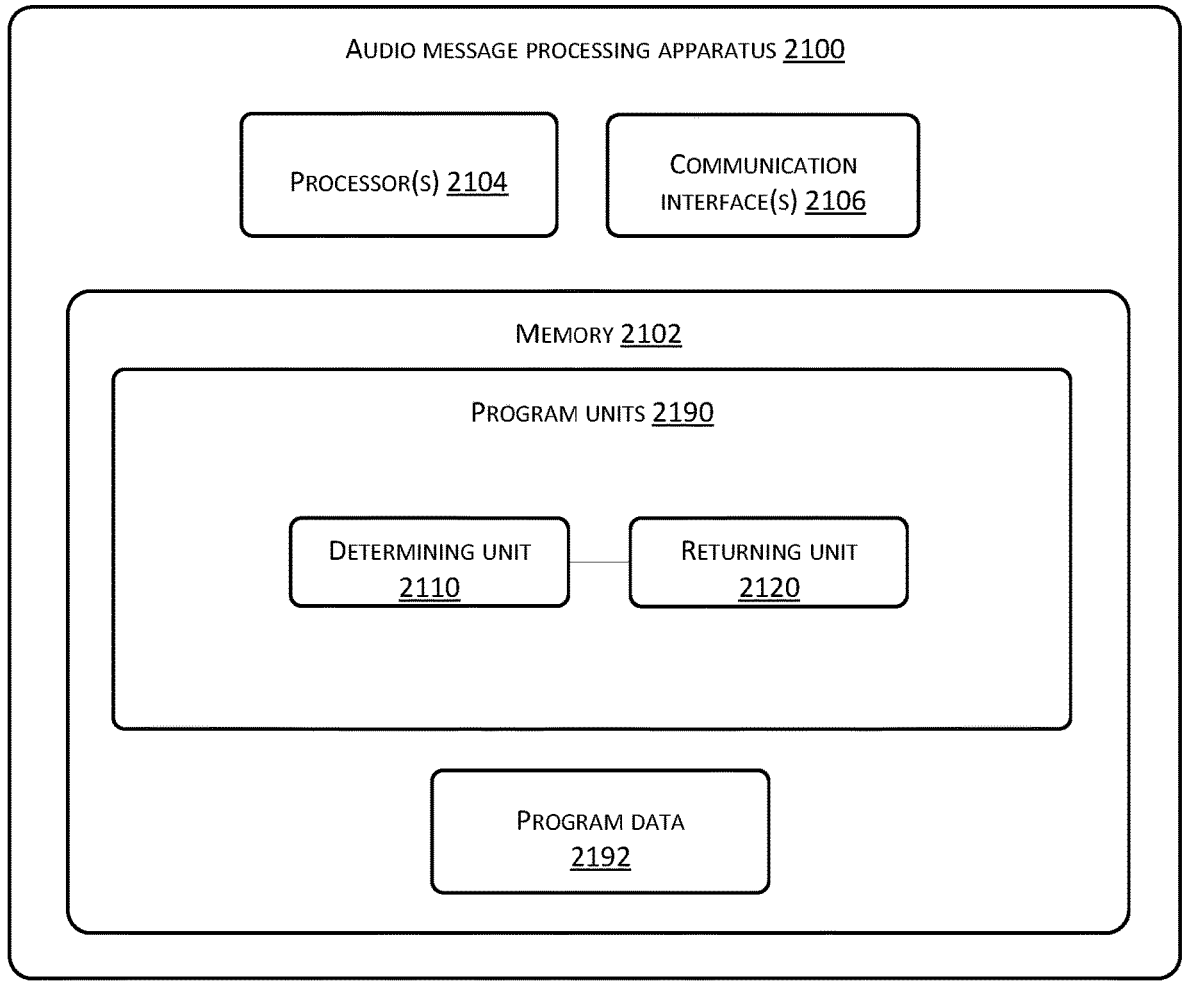
FIG. 21 is a block diagram of an audio message processing apparatus based on a communication device end provided according to a fourth example embodiment of the present disclosure.

According to an example embodiment, referring to FIG. 21, an audio message processing apparatus 2100 may include: memory 2102, one or more processors 2104, and one or more communication interfaces 2106. The audio message processing apparatus 2100 may further include a determining unit 2110 and a returning unit 2120. Herein:

Memory 2102 is operative to store program instructions and/or data.

One or more processors 2104, through reading program instructions and/or data stored on memory 2102, is operative to execute processes as follows:

The determining unit 2110 is stored in the memory 2102 and executable by the one or more processors 2104 to cause the one or more processors 2104 of a server to, upon receipt by the one or more communication interfaces 2106 of an audio conversion request of any communicating party targeting any audio message, determine non-responded audio messages relating to the any communicating party;

The returning unit 2120 is stored in the memory 2102 and executable by the one or more processors 2104 to cause the one or more processors 2104 of the server to respectively acquire text content pertaining to the any audio message and the non-responded audio messages, and cause the one or more communication interfaces 2106 to return the text content to the any communicating party.

Optionally, the returning unit 2120 is executable by the one or more processors 2104 to:

Cause the one or more processors 2104 of the server to respectively convert the any audio message and the non-responded audio messages to pertinent text content;

Or, cause the one or more processors 2104 of the server to respectively look up pre-converted text content pertaining to the any audio message and the non-responded audio messages.

In implementations, the memory 2102 may include program units 2190 and program data 2192. The program units 2190 may include one or more of the units as described in above.

Figure 22:
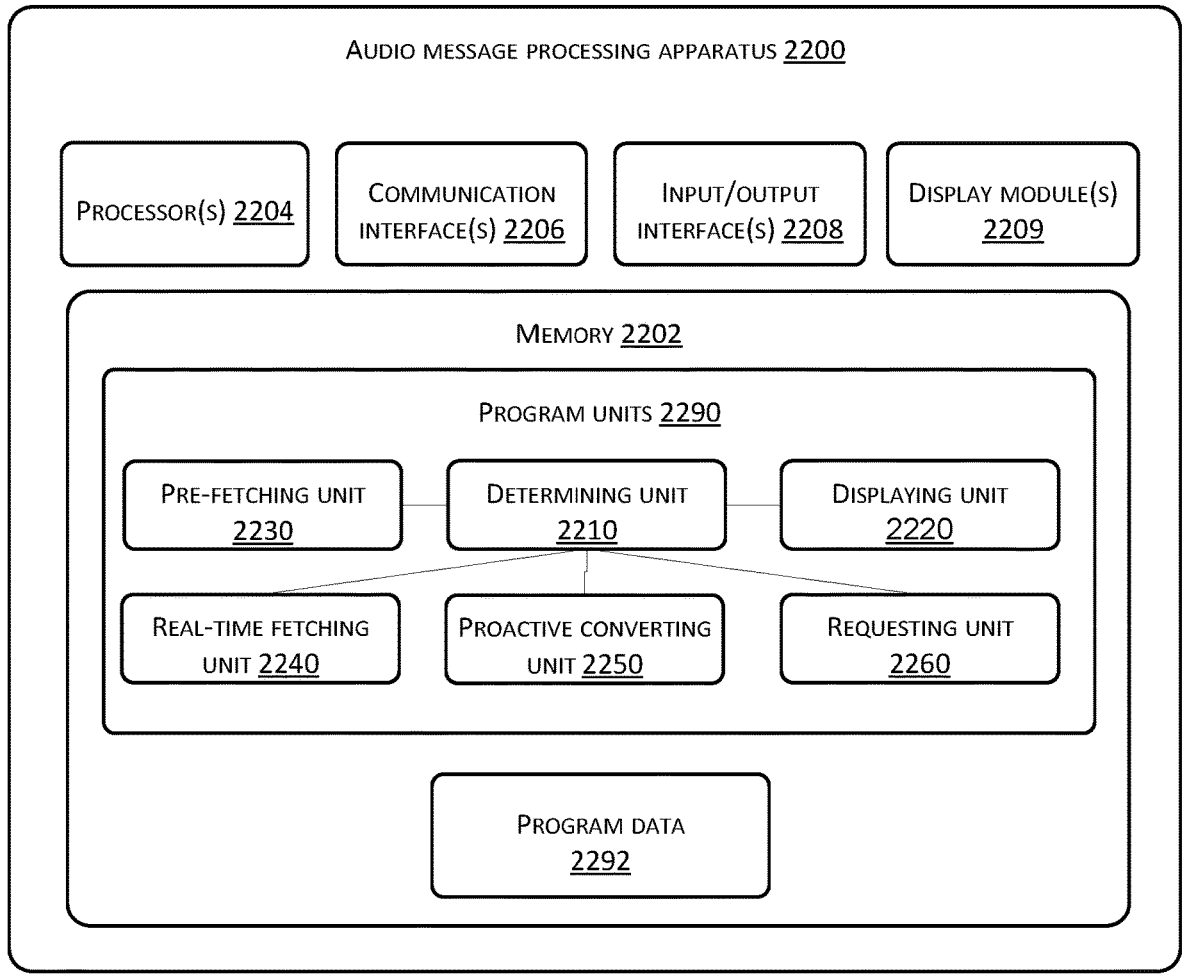
FIG. 22 is a block diagram of an audio message processing apparatus based on a communication device end provided according to a fifth example embodiment of the present disclosure.

According to an example embodiment, referring to FIG. 22, the audio message processing apparatus 2200 may include: memory 2202, one or more processors 2204, one or more communication interfaces 2206, one or more input/output interfaces 2208, and one or more display modules 2209. The audio message processing apparatus 2200 may further include a determining unit 2210 and a displaying unit 2220. Herein:

Memory 2202 is operative to store program instructions and/or data.

One or more processors 2204, through reading program instructions and/or data stored on memory 2202, is operative to execute processes as follows:

The determining unit 2210 is stored in the memory 2202 and executable by the one or more processors 2204 to cause the one or more processors 2204 of a present end communication device to, upon receipt of an audio conversion command issued by a user targeting the any audio message, respectively determine a first text content pertaining to the any audio message, and a second text content pertaining to the non-responded audio messages aside from the any audio message;

The displaying unit 2220 is stored in the memory 2202 and executable by the one or more processors 2204 to cause the one or more processors 2204 of a present end communication device to respectively display in association the first text content with the any audio message, and the second text content with the non-responded audio messages.

Optionally, the apparatus 2200 further includes:

A pre-fetching unit 2230 stored in the memory 2202 and executable by the one or more processors 2204 to cause the one or more processors 2204 of the present end communication device to, before receiving the audio conversion command, pre-fetch the first text content and the second text content;

Or, a real-time fetching unit 2240 stored in the memory 2202 and executable by the one or more processors 2204 to cause the one or more processors 2204 of the present end communication device to, after receiving the audio conversion command, fetch the first text content and the second text content in real time.

Optionally, the apparatus 2200 further includes:

A proactive converting unit 2250 stored in the memory 2202 and executable by the one or more processors 2204 to cause the one or more processors 2204 of the present end communication device to proactively convert the any audio message and the non-responded audio message to the first text content and the second text content;

Or, a requesting unit 2260 stored in the memory 2202 and executable by the one or more processors 2204 to cause the one or more communication interfaces 2206 of the present end communication device to send an audio conversion request to a server, and acquire the first text content and the second text content returned by the server; wherein, the first text content and the second text content result from real-time conversion by the server based on the audio conversion request, or result from pre-conversion by the server.

In implementations, the memory 2202 may include program units 2290 and program data 2292. The program units 2290 may include one or more of the units as described in above.

According to a typical configuration, a computing device includes one or more processors (CPUs), input/output interfaces, network interfaces and storage. Each memory as recited by the above-mentioned example embodiments is an example of storage.

Storage may include non-permanent memory in a computer-readable media, random access memory (RAM), and/or non-volatile memory and the like, such as read-only memory (ROM) or flash RAM. Storage is an example of a computer-readable media.

The computer readable media may include a volatile or non-volatile type, a removable or non-removable media, which may achieve storage of information using any method or technology. The information may include a computer-readable instruction, a data structure, a program module, program unit or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should further be stated that the terms "including," "containing," or any other variations thereof are intended to cover non-exclusive containment, and therefore a process, method, product or device including a series of elements does not only include those elements, but also includes other elements not expressly listed, or also includes elements which these processes, methods, products or devices inherently possess. Where not further limited, elements limited by the statement "including a . . . " do not exclude other analogous elements from existing within a process, method, product or device including the elements.

With regard to example embodiments of the present disclosure implemented as a method, when any step thereof is described as performed by a structural element "upon receipt" of any communication, such as instructions including requests, commands, and the like, if the structural element has parts or components, the receipt of the communication may occur at any part or component of the structural element capable of receiving communications, and the step shall not necessarily be performed by the same part or component of the structural element receiving the communication. With regard to example embodiments of the present disclosure implemented as an apparatus and the like, including one or more elements such as units and the like, when any such elements are described as performing any step "upon receipt" of any communication, such as instructions including requests, commands, and the like, the receipt of the communication shall not necessarily occur at the element itself, but may occur at any element of the embodiment capable of receiving communications, and the step shall not necessarily be performed upon the element itself receiving the communication, and may be performed upon receipt of the communication at any element of the embodiment capable of receiving communications.

The above describes only exemplary embodiments of the present disclosure, and shall not be limiting to the present disclosure, and modifications, equivalent substitutions, improvements and the like made within the spirit and principle of the present disclosure, shall be contained within the scope of protection of the present disclosure.

The present disclosure may further be understood with clauses as follows.

1. An audio message processing method, comprising:
    a server recognizing types of communication messages transmitted between communicating counterparties;
    when a type of any communication message is an audio type, the server acquiring the any communication message, and converting the any communication message to corresponding text content; and
    upon determining that any communicating party has a conversion need for the any communication message, the server sending the text content to the any communicating party.

2. The method of clause 1, wherein upon determining that the any communicating party has the conversion need for the any communication message, the server sending the text content to the any communicating party comprises:
    when the any communicating party during a communication procedure belongs to a preset communication role, the server deciding that the any communicating party has the conversion need, and sending the text content.

3. The method of clause 1, wherein upon determining that any communicating party has a conversion need for the any communication message, the server sending the text content to the any communicating party comprises:
    upon receipt of an audio conversion request of the any communicating party targeting the any communication message, the server deciding that the any communicating party has the conversion need, and returning to the any communicating party pre-converted text content pertaining to the any communication message.

4. The method of clause 3, further comprising:
the server determining response statuses of communication messages transmitted between the communicating counterparties; and
upon receipt of the audio conversion request of the communicating party targeting the communication message, if a non-responded communication message of the audio type related to the any communicating party exists, the server further returning pre-converted text content pertaining to all non-responded communication messages of the audio type to the any communicating party.

5. The method of clause 3, further comprising:
after returning the pre-converted text content pertaining to the any communication message to the any communicating party, the server deciding to switch the any communication message to a responded status; and
the server notifying a sending party of the any communication message of the responded status.

6. The method of clause 1, wherein the server acquiring the any communication message, and converting the any communication message to corresponding text content comprises:
the server successively receiving audio segments segmented and uploaded in real time based on preset rules by the communicating party, and respectively pre-converting each audio segment to a corresponding text fragment; and
the server successively combining all text fragments, resulting in the text content.

7. An audio message processing method, comprising:
a present end communication device, upon receipt of an audio conversion command issued by a user targeting any communication message of an audio type, initiating a corresponding audio conversion request to a server; and
the present end communication device receiving text content pertaining to the any communication message returned by the server, and displaying the text content in association with the any communication message; wherein, the text content is obtained from pre-conversion on a proactive basis by the server before the server receives the audio conversion request.

8. The method of clause 7, further comprising:
the present end communication device determining response statuses of the user for each communication message of the audio type already received;
wherein, upon receipt of the audio conversion command targeting the any communication message issued by the user, if there exist non-responded communication messages of the audio type aside from the any communication message, the audio conversion request further relates to the non-responded communication messages.

9. The method of clause 7, further comprising:
after the present end communication device receives the text content returned by the server, expanding a display region of the corresponding communication message;
wherein, the display region after expansion is divided into a first region and a second region; the first region being operative to show the corresponding communication message, and the second region being operative to show the text content pertaining to the communication message.

10. An audio message processing method, comprising:
a present end communication device pre-fetching text content pertaining to any communication message of an audio type; and
upon receipt of the audio conversion command targeting the any communication message issued by a user, the present end communication device showing the pre-fetched text content.

11. The method of clause 10, wherein the present end communication device pre-fetching text content pertaining to the any communication message of the audio type comprises:
the present end communication device pre-fetching the text content from a server, the text content resulting from pre-conversion by the server;
or, the present end communication device performing pre-conversion processing upon the any communication message, resulting in the text content.

12. The method of clause 10, wherein the present end communication device pre-fetching text content pertaining to the any communication message of the audio type comprises:
the present end communication device receiving the text content pushed by a server;
or, the present end communication device, when determining the types of communication messages transmitted between peer communication devices, if determining the type of the any communication message to be the audio type, pre-fetching text content pertaining to the any communication message.

13. The method of clause 10, further comprising:
upon receipt of the audio conversion command issued by the user targeting the any communication message, if there exist other communication messages of the audio type having a non-responded status, the present end communication device respectively showing pre-fetched text content pertaining to the other communication messages.

14. The method of clause 13, further comprising:
the present end communication device, after respectively showing pre-fetched text content pertaining to the other communication messages, issuing a response status switching notification pertaining to the other communication messages to a server, the server notifying a pertinent sending party of the responded status of the other communication messages.

15. An audio message processing method, comprising:
during a procedure of generating a communication message of an audio type, a present end communication device successively determining whether each collected audio segment satisfies preset segmentation rules; and
upon any audio segment satisfying the preset segmentation rules, the present end communication device uploading the any audio segment in real time to a server, the server pre-converting the audio segment to a corresponding text fragment, the text fragment pertaining to the audio segment being successively combined by the server into text content pertaining to the communication message.

16. An audio message processing apparatus, comprising:
a recognizing unit, which causes a server to recognize types of communication messages transmitted between communicating counterparties;
a pre-converting unit, which, when the type of any communication message is an audio type, causes the server to acquire the any communication message, and pre-convert the any communication message to corresponding text content; and
a sending unit, which, upon a determination that any communicating party has a conversion need for the any communication message, causes the server to send the text content to the any communicating party.

17. The apparatus of clause 16, wherein the sending unit is particularly operative to:
when the any communicating party in the communication procedure belongs to a preset communication role, cause the server to decide that the any communicating party has the conversion need, and to send the text content.

18. The apparatus of clause 16, wherein the sending unit is particularly operative to:
upon receipt of an audio conversion request of the any communicating party targeting the any communication message, cause the server to decide that the any communicating party has the conversion need, and return pre-converted text content pertaining to the any communication message to the any communicating party.

19. The apparatus of clause 18, further comprising:
a determining unit which causes the server to determine response statuses of the communicating counterparties for transmitted communication messages; and
a returning unit, which, upon receipt of the audio conversion request of any communicating party targeting the any communication message, if there exist non-responded communication messages of the audio type relating to the any communicating party, causes the server to further return pre-converted text content pertaining to all non-responded communication messages of the audio type to the any communicating party.

20. The apparatus of clause 18, further comprising:
a deciding unit, which, after the pre-converted text content pertaining to the any communication message is returned to the any communicating party, causes the server to decide to switch the any communication message to a responded status; and
a notifying unit which causes the server to notify a sending party of the any communication message of the responded status.

21. The apparatus of clause 16, wherein the pre-converting unit is particularly operative to:
cause the server to successively receive audio segments segmented and uploaded in real time based on preset rules by the communicating party, and respectively pre-convert each audio segment to a corresponding text fragment;
the server successively combining all text fragments, resulting in the text content.

22. An audio message processing apparatus, comprising:
a requesting unit, which causes a present end communication device to, upon receipt of an audio conversion command issued by a user targeting any communication message of an audio type, initiate a corresponding audio conversion request to a server; and
a displaying unit, which causes the present end communication device to receive text content pertaining to the any communication message returned by the server, and display the text content in association with the any communication message; wherein, the text content results from proactive pre-conversion by the server before the audio conversion request is received.

23. The apparatus of clause 22, further comprising:
a determining unit causes the present end communication device to determine response statuses of the user for the already received communication messages of the audio type;
wherein, upon receipt of the audio conversion command issued by the user targeting the any communication message, if non-responded communication messages of the audio type exist aside from the any communication message, the audio conversion request is also related to the non-responded communication messages.

24. The apparatus of clause 22, further comprising:
an expanding unit which causes the present end communication device to, after receiving the text content returned by the server, perform expansion upon the display region of corresponding communication messages;
wherein, the expanded display region is divided into a first region and a second region; the first region being operative to show a corresponding communication message, and the second region being operative to show text content pertaining to the communication message.

25. An audio message processing apparatus, comprising:
a pre-fetching unit, which causes a present end communication device to pre-fetch text content pertaining to any communication message of an audio type; and
a displaying unit, which, upon receipt of an audio conversion command issued by a user targeting the any communication message, causes the present end communication device to show the pre-fetched text content.

26. The apparatus of clause 25, wherein the pre-fetching unit is particularly operative to:
cause the present end communication device to pre-fetch the text content from a server, the text content resulting from pre-conversion by the server;
or, cause the present end communication device to perform pre-conversion processing upon the any communication message, resulting in the text content.

27. The apparatus of clause 25, wherein the pre-fetching unit is particularly operative to:
cause the present end communication device to receive the text content pushed by the server;
or, cause the present end communication device to, when determining the types of communication messages transmitted between peer communication devices, if determining the type of the any communication message to be the audio type, pre-fetching text content pertaining to the any communication message.

28. The apparatus of clause 25, further comprising upon receipt of an audio conversion command issued by the user targeting the any communication message, if there exist other communication messages of the audio type having a non-responded status, the displaying unit further causes the present end communication device to respectively show pre-fetched text content pertaining to the other communication messages.

29. The apparatus of clause 28, further comprising:
a notification unit which causes the present end communication device to, after respectively showing pre-fetched text content pertaining to the other communication messages, issue a response status switching notification pertaining to the other communication messages to the server, the server notifying a pertinent sending party of the responded status of the other communication messages.

30. An audio message processing apparatus, comprising:
a determining unit, which, during the procedure of generating communication messages of an audio type, causes a present end communication device to successively determine whether each already collected audio segment satisfies a preset segmentation rule; and
a processing unit, which, upon any audio segment satisfying the preset segmentation rule, causing the present end communication device to segment and upload the any audio segment to a server in real time, the server pre-converting the any audio segment to a corresponding text fragment, text fragments pertaining to all audio segments being successively combined by the server into text content pertaining to the communication message.

31. An audio message processing method, comprising:
upon receipt of an audio conversion request of any communicating party targeting any audio message, a server determining a non-responded audio message relating to the any communicating party; and
the server respectively obtaining text content pertaining to the any audio message and the non-responded audio message, and returning the text content to the any communicating party.

32. The method of clause 31, wherein the server respectively obtaining text content pertaining to the any audio message and the non-responded audio message, and returning the text content to the any communicating party comprises:
the server respectively converting the any audio message and the non-responded audio messages to pertinent text content;
or, the server respectively looking up the pre-converted text content pertaining to the above-mentioned any audio message and non-responded audio messages.

33. An audio message processing method, comprising:
upon receipt of an audio conversion command issued by a user targeting any audio message, a present end communication device respectively determining a first text content pertaining to the any audio message, and a second text content pertaining to non-responded audio messages aside from the any audio message; and
the present end communication device respectively displaying in association the first text content with the any audio message, and the second text content with the non-responded audio messages.

34. The method of clause 33, further comprising:
before receiving the audio conversion command, the communication device pre-fetching the first text content and the second text content;
or, after receiving the audio conversion command, the communication device fetching the first text content and the second text content in real time.

35. The method of clause 33, wherein the communication device through either below-mentioned method fetches the first text content and the second text content:
the communication device proactively converting the any audio message and the non-responded audio messages to the first text content and the second text content;
or, the communication device initiating an audio conversion request to a server, and obtaining the first text content and the second text content returned by the server;
wherein, the first text content and the second text content result from real-time conversion by the server based on the audio conversion request, or the first text content and the second text content result from pre-conversion by the server.

36. An audio message processing apparatus, comprising:
a determining unit, which, upon receipt of an audio conversion request of any communicating party targeting any audio message, causes a server to determine non-responded audio messages relating to the any communicating party; and
a returning unit which causes the server to respectively acquire text content pertaining to the any audio message and the non-responded audio messages, and return the text content to the any communicating party.

37. The apparatus of clause 36, wherein the returning unit is particularly operative to:
cause the server to respectively convert the any audio message and the non-responded audio messages to pertinent text content;
or, cause the server to respectively look up pre-converted text content pertaining to the any audio message and the non-responded audio messages.

38. An audio message processing apparatus, comprising:
a determining unit, which, upon receipt of an audio conversion command issued by a user targeting the any audio message, causes a present end communication device to respectively determine a first text content pertaining to the any audio message, and a second text content pertaining to non-responded audio messages aside from the any audio message; and
a displaying unit which causes the present end communication device to respectively display in association the first text content with the any audio message, and the second text content with the non-responded audio messages.

39. The apparatus of clause 38, further comprising:
a pre-fetching unit, which, before receiving the audio conversion command, causes the present end communication device to pre-fetch the first text content and a second text content;
or, a real-time fetching unit, which, after receiving the audio conversion command, causes the present end communication device to fetch the first text content and the second text content in real time.

40. The apparatus of clause 39, further comprising:
a proactive converting unit which causes the present end communication device to proactively convert the any audio message and the non-responded audio message to the first text content and the second text content;
or, a requesting unit which causes the present end communication device to send an audio conversion request to a server, and acquire the first text content and the second text content returned by the server; wherein, the first text content and the second text content result from real-time conversion by the server based on the audio conversion request, or result from pre-conversion by the server.

What is claimed is:

1. A method comprising:
receiving, by a present end communication device, a first communication message of a first audio type and a second communication message of a second audio type, the first audio type being an audio message and the second audio type being a video message;
in response to receiving a first audio conversion command to convert the first communication message into text, pre-fetching, by the present end communication device, a text content pertaining to the second communication message, prior to receiving a second audio conversion command to convert the second communication message, the text content being converted from the second communication message; and
showing, by the present end communication device, the pre-fetched text content.

2. The method of claim 1, wherein the pre-fetching, by the present end communication device, the text content pertaining to the second communication message comprises:

pre-fetching, by the present end communication device, the text content from a server, the text content resulting from pre-conversion by the server.

3. The method of claim 1, wherein the pre-fetching, by the present end communication device, the text content pertaining to the second communication message comprises:
   initiating, by the present end communication device, an audio conversion request to a server; and
   acquiring text content obtained from conversion processing by the server.

4. The method of claim 1, wherein the pre-fetching, by the present end communication device, the text content pertaining to the second communication message comprises:
   performing, by the present end communication device, pre-conversion processing in response to receiving the second communication message, resulting in the text content.

5. The method of claim 1, wherein the pre-fetching, by the present end communication device, the text content pertaining to the second communication message comprises:
   receiving, by the present end communication device, the text content pushed by a server.

6. The method of claim 1, wherein the pre-fetching, by the present end communication device, the text content pertaining to the second communication message comprises:
   pre-fetching, by the present end communication device, in response to determining that the second audio type is the video message.

7. The method of claim 1, further comprising:
   respectively showing, by the present end communication device, upon a receipt of the first audio conversion command issued by a user targeting the first communication message and determining that there exist other communication messages of an audio type having a non-responded status, pre-fetched text content pertaining to the other communication messages.

8. The method of claim 7, further comprising:
   issuing, by the present end communication device, after respectively showing pre-fetched text content pertaining to the other communication messages, a response status switching notification pertaining to the other communication messages to a server.

9. An audio message processing apparatus comprising:
   one or more processors; and
   one or more memories storing therein computer-readable instructions that, when executed by the one or more processors, cause the one or more processors to perform acts, the acts comprising:
   receiving a first communication message of a first audio type and a second communication message of a second audio type, the first audio type being an audio message and the second audio type being a video message;
   in response to receiving a first audio conversion command to convert the first communication message into text, pre-fetching a text content pertaining to the second communication message, prior to receiving a second audio conversion command to convert the second communication message; and
   showing the pre-fetched text content.

10. The audio message processing apparatus of claim 9, wherein the pre-fetching the text content pertaining to the second communication message comprises pre-fetching the text content from a server, the text content resulting from pre-conversion by the server.

11. The audio message processing apparatus of claim 9, wherein the pre-fetching the text content pertaining to the second communication message comprises performing pre-conversion processing upon receiving the second communication message, resulting in the text content.

12. The audio message processing apparatus of claim 9, wherein the acts further comprise receiving the text content pushed by a server.

13. The audio message processing apparatus of claim 9, wherein the pre-fetching the text content pertaining to the second communication message comprises:
   pre-fetching the text content pertaining to the second communication message in response to determining that the second audio type is the video message.

14. The audio message processing apparatus of claim 9, wherein the acts further comprise:
   respectively showing, upon a receipt of the first audio conversion command issued by a user targeting the first communication message and determining that there exist other communication messages of an audio type having a non-responded status, pre-fetched text content pertaining to the other communication messages.

15. The audio message processing apparatus of claim 14, wherein the acts further comprise:
   issuing a response status switching notification pertaining to the other communication messages to a server after respectively showing pre-fetched text content pertaining to the other communication messages.

16. One or more computer-readable media storing therein computer-readable instructions that, when executed by one or more processors, cause the one or more processors to perform operations comprising:
   receiving, by a present end communication device, a first communication message of a first audio type and a second communication message of a second audio type, the first audio type being an audio message and the second audio type being a video message;
   in response to receiving a first audio conversion command to convert the first communication message into text, pre-fetching a text content pertaining to the second communication message, prior to receiving a second audio conversion command to convert the second communication message; and
   showing the pre-fetched text content.

17. The one or more computer-readable media of claim 16, wherein the pre-fetching the text content pertaining to the second communication message comprises:
   pre-fetching the text content from a server, the text content resulting from pre-conversion by the server.

18. The one or more computer-readable media of claim 16, wherein the pre-fetching the text content pertaining to the second communication message comprises:
   initiating an audio conversion request to a server and acquiring text content obtained from conversion processing by the server.

19. The one or more computer-readable media of claim 16, wherein the pre-fetching the text content pertaining to the second communication message comprises:
   performing pre-conversion processing upon receiving the second communication message, resulting in the text content.

20. The one or more computer-readable media of claim 16, wherein the pre-fetching the text content pertaining to the second communication message comprises:
   receiving the text content pushed by a server.

* * * * *